US011390555B2

(12) United States Patent
Argaw et al.

(10) Patent No.: US 11,390,555 B2
(45) Date of Patent: Jul. 19, 2022

(54) SYSTEMS AND METHODS FOR PROCESSING AN OPTICAL FIBER

(71) Applicant: CORNING INCORPORATED, Corning, NY (US)

(72) Inventors: Yacob Mesfin Argaw, Painted Post, NY (US); Nikolaos Pantelis Kladias, Horseheads, NY (US); Robert Clark Moore, Wilmington, NC (US); Bruce Warren Reding, Corning, NY (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 108 days.

(21) Appl. No.: 16/890,055

(22) Filed: Jun. 2, 2020

(65) Prior Publication Data

US 2020/0385302 A1    Dec. 10, 2020

Related U.S. Application Data

(60) Provisional application No. 62/857,980, filed on Jun. 6, 2019.

(51) Int. Cl.
*C03B 37/027* (2006.01)
*C03B 37/029* (2006.01)

(52) U.S. Cl.
CPC ...... *C03B 37/02718* (2013.01); *C03B 37/029* (2013.01); *C03B 2205/55* (2013.01)

(58) Field of Classification Search
CPC .. C03B 37/0218; C03B 37/29; C03B 2205/55
See application file for complete search history.

(56) References Cited

U.S. PATENT DOCUMENTS 6,789,400 B2    9/2004  Lu et al.
8,573,008 B2   11/2013  Faler et al.
(Continued)

FOREIGN PATENT DOCUMENTS

WO    2011/150056 A1   12/2011

OTHER PUBLICATIONS

Alexander C. Bayeh, "Analysis of Mach Disks from an Underexpanded Nozzle Using Experimental and Computational Methods", 47th AIAA Aerospace Sciences Meeting Including The New Horizons Forum and Aerospace Exposition, 2009, 7 pages.
(Continued)

*Primary Examiner* — Lisa L Herring
(74) *Attorney, Agent, or Firm* — Kevin L. Bray

(57) ABSTRACT

A system and method for processing an optical fiber includes a treatment device disposed downstream of a furnace and including a treating zone. The treating zone includes a fiber inlet and fiber outlet and is configured to cool the optical fiber at a reduced pressure below ambient pressure and at a slow cooling rate less than an ambient cooling rate. A nozzle assembly is disposed at one or more of the fiber inlet, the fiber outlet, upstream of the treating zone, and downstream of the treating zone. The nozzle assembly includes multiple baffle plates defining a number of nozzle chambers, each nozzle chamber having a nozzle chamber pressure, wherein each baffle plate includes an orifice having a predetermined effective orifice diameter through which the optical fiber passes. Each nozzle chamber is configured to sequentially change a nozzle chamber pressure between the reduced pressure and ambient pressure.

10 Claims, 10 Drawing Sheets

(56) References Cited

U.S. PATENT DOCUMENTS

| | | |
|---|---|---|
| 8,973,408 B2 | 3/2015 | Filippov et al. |
| 2011/0289979 A1* | 12/2011 | Faler ................. C03B 37/02718 65/424 |
| 2016/0168008 A1* | 6/2016 | Bookbinder .......... C03B 37/032 428/364 |
| 2017/0217822 A1 | 8/2017 | Imase |
| 2019/0359517 A1 | 11/2019 | Argaw et al. |

OTHER PUBLICATIONS

International Search Report and Written Opinion of the International Searching Authority; PCT/US2020/035686; dated Oct. 6, 2020; 13 Pages; European Patent Office.

* cited by examiner

SYSTEMS AND METHODS FOR PROCESSING AN OPTICAL FIBER

This application claims priority under 35 USC § 119(e) from U.S. Provisional Patent Application Ser. No. 62/857,980, filed on Jun. 6, 2019, and which is incorporated by reference herein in its entirety.

FIELD

The present disclosure generally relates to systems and methods for processing optical fibers and more specifically for cooling optical fibers at low pressures below ambient pressure.

BACKGROUND

The process of manufacturing optical fibers generally includes forming optical preforms that are heated to temperatures greater than the glass softening point, drawing the optical preform to form an optical fiber, cooling the optical fiber, and then coating the optical fiber. The draw temperatures, draw down ratios, and draw speeds can result in the glass of the optical fiber being far from equilibrium, which may result in a high fictive temperature. High fictive temperature and fiber defects have been associated with increased signal attenuation in optical fibers used for transmission of optical signals. The high temperatures typically used in heating the preform can result in defects in the fiber structure, which can increase signal attenuation in the optical fibers. Processing conditions such as pressure and temperature can be controlled to slowly cool the optical fiber in a treatment device, which may reduce the fictive temperature of the optical fiber and/or reduce the presence of fiber defects. Air flow into the treatment device can alter the cooling rate of the optical fiber, which may affect the properties of the optical fiber. The amount and speed of air flow into the treatment device can increase as a pressure differential between the interior and exterior of the treatment device increases. The air flow into the slow cooling device may also induce vibrations in the optical fiber that could result in undesirable contact between the optical fiber and the components of the slow cooling device.

In view of these considerations, there is a need for a system and method for slowly cooling an optical fiber that decreases an amount and/or velocity of air flowing into a treatment device operating at a reduced pressure compared to ambient pressure that could undesirably alter the cooling rate of the optical fiber and induce vibrations in the optical fiber.

SUMMARY

According to an aspect of the present disclosure, a system for processing an optical fiber includes a furnace configured to produce an optical fiber from a fiber preform and a treatment device downstream of the furnace including a treating zone. The treating zone includes a fiber inlet and fiber outlet and is configured to cool the optical fiber at a reduced pressure below ambient pressure and at a slow cooling rate less than an ambient cooling rate. A nozzle assembly is disposed at one or more of the fiber inlet, the fiber outlet, upstream of the treating zone, and downstream of the treating zone. The nozzle assembly includes multiple baffle plates defining a number of nozzle chambers, each of the nozzle chambers having a nozzle chamber pressure. Each baffle plate includes an orifice having a predetermined effective orifice diameter through which the optical fiber passes. The number of nozzle chambers include a first nozzle chamber having a nozzle chamber pressure $P_a$ and a second nozzle chamber having a nozzle chamber $P_b$, wherein $P_b < P_a$ and the second nozzle chamber is adjacent to the first nozzle chamber. The ratio $P_b/P_a$ is in a range from 60% to 140% of a pressure change ratio r defined by Formula (I):

$$r = 1 - \left(\frac{P_{reduced}}{P_{ambient}}\right)^{\frac{1}{n}} \quad (I)$$

wherein n is one more than the number of nozzle chambers in the nozzle assembly.

According to an aspect of the present disclosure, a method for processing an optical fiber includes drawing the optical fiber from a heated glass source and passing the optical fiber through a treatment device comprising a treating zone comprising a fiber inlet and a fiber outlet. The optical fiber is cooled in the treating zone at a reduced pressure below ambient pressure and at a slow cooling rate less than an ambient cooling rate. The optical fiber is passed through a nozzle assembly disposed at one or more of the fiber inlet, the fiber outlet, upstream of the treating zone, and downstream of the treating zone. The nozzle assembly includes multiple baffle plates defining a number of nozzle chambers, each of the nozzle chambers having a nozzle chamber pressure, wherein each baffle plate includes an orifice having a predetermined effective orifice diameter through which the optical fiber passes. The method includes sequentially changing a nozzle chamber pressure in each nozzle chamber. The multiple nozzle chambers includes a first nozzle chamber having a nozzle chamber pressure $P_a$ and a second nozzle chamber having a nozzle chamber pressure $P_b$, wherein $P_b < P_a$ and the second nozzle chamber is adjacent to the first nozzle chamber. A ratio of $P_b/P_a$ is in a range from 60% to 140% of a pressure change ratio r defined by Formula (I):

$$r = 1 - \left(\frac{P_{reduced}}{P_{ambient}}\right)^{\frac{1}{n}} \quad (I)$$

wherein n is one more than the number of nozzle chambers in the nozzle assembly.

These and other aspects, objects, and features of the present disclosure will be understood and appreciated by those skilled in the art upon studying the following specification, claims, and appended drawings.

DETAILED DESCRIPTION

Figure 1:
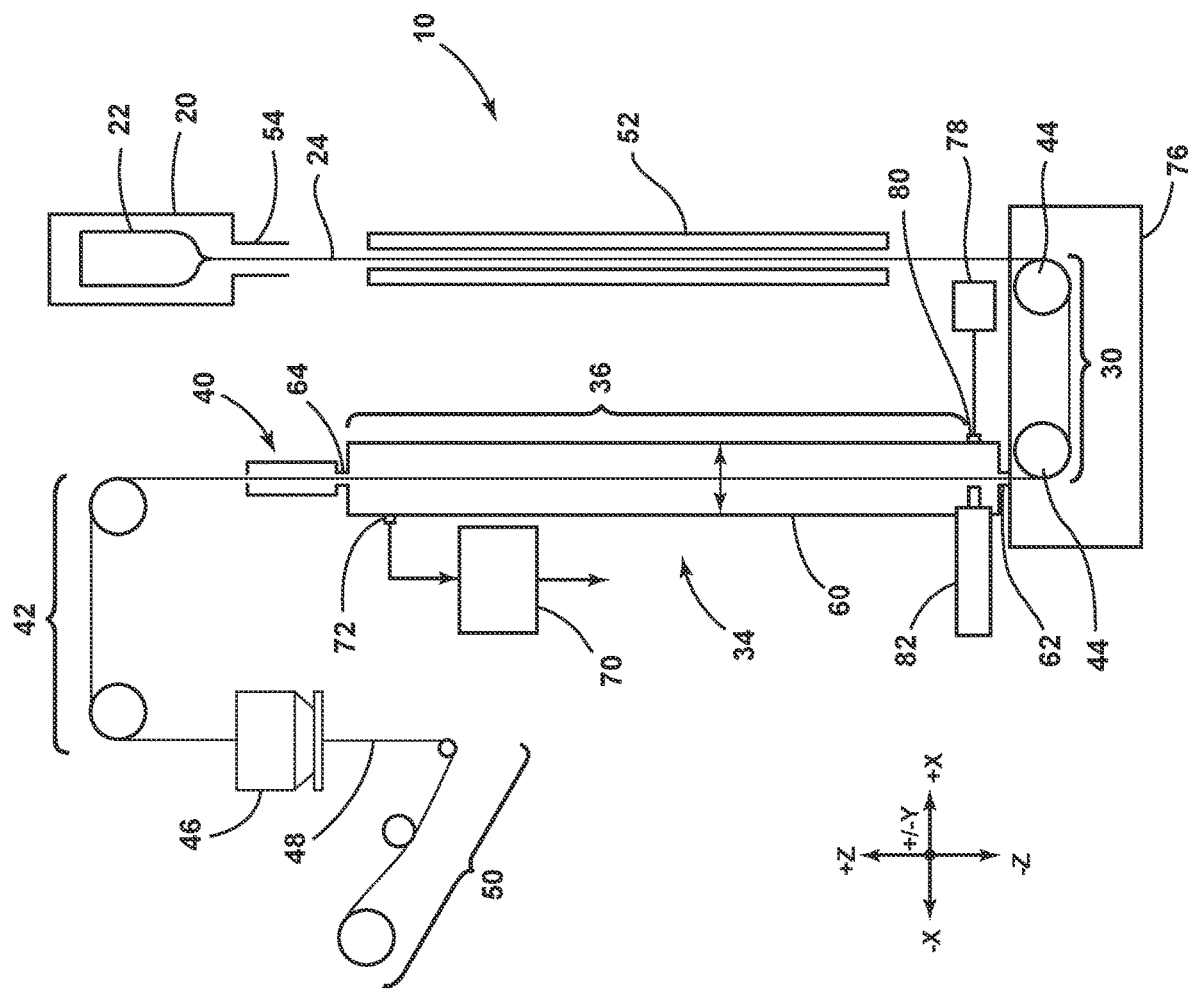
FIG. 1 is a schematic view of a system for processing an optical fiber, according to aspects of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein, the term "process pathway" refers to the pathway that an optical fiber follows from a draw furnace through one or more treatment processes, treatment devices, and/or components. The terms "downstream" and "upstream" are used herein to refer to a position of a treatment process, treatment device, or component relative to the furnace. For example, the term "downstream" is used to refer to a position that is farther away from the draw furnace along the process pathway relative to another treatment process or component. The term "upstream" is used herein to refer to a position that is closer to the draw furnace along the process pathway relative to another treatment process or component. Similarly, "upstream direction" and "downstream direction" refer, respectively, to directions toward and away from the draw furnace along the process pathway.

Optical loss (also referred to as attenuation) is an important aspect of optical fiber quality. Optical loss in optical fibers is due at least in part to Rayleigh scattering. The Rayleigh scattering coefficient is proportional to the fictive temperature of an optical fiber, which can be reduced by slow cooling of the optical fiber after the optical fiber is drawn from the draw furnace. Slow cooling of the optical fiber in a slow cooling device at a reduced pressure less than ambient pressure can lower the fictive temperature of the optical fiber, which can reduce optical loss due to Rayleigh scattering.

When an optical fiber passes between an ambient pressure environment and a reduced pressure environment inside a slow cooling device operating at a reduced pressure, for example 0.2 atmospheres (20.3 kilopascals), the optical fiber may become entrained in a high velocity air jet as a result of the pressure differential between the ambient pressure environment surrounding the slow cooling device and the reduced pressure environment within the slow cooling device. Entrainment of the optical fiber by a high velocity air jet may contribute to undesirable fiber quenching through convective cooling of the optical fiber and/or induce vibrations that may result in the optical fiber contacting the components through which the optical fiber passes.

Aspects of the present disclosure relate to a nozzle assembly that is configured to reduce a velocity of an entrained air jet as the optical fiber exits and/or enters a treatment device operating at a reduced pressure. In some aspects, the nozzle assembly includes multiple nozzle chambers in which a pressure in each nozzle chamber is sequentially increased as the optical fiber exits a treatment device operating at a reduced pressure and/or is sequentially decreased as the optical fiber enters a treatment device operating at a reduced pressure to reduce an amount and/or a velocity of the air jet entering the treatment device.

The present illustrated embodiments reside primarily in combinations of method steps and apparatus components relating to processing optical fibers using a treatment device that includes cooling the optical fiber in a treating zone operated at a reduced pressure $P_{reduced}$ below the ambient pressure $P_{ambient}$ of the external environment surrounding the treatment device and at a slow cooling rate less than an ambient cooling rate of the fiber. The system can include a draw furnace configured to produce an optical fiber from a fiber preform. The treatment device is disposed downstream of the draw furnace and can include a treating zone having a fiber inlet and a fiber outlet. The treating zone can be configured to cool the optical fiber at a reduced pressure below ambient pressure and at a slow cooling rate less than an ambient cooling rate. Aspects of the present disclosure relate to a nozzle assembly disposed at the fiber inlet, the fiber outlet, upstream of the treating zone and/or downstream of the treating zone. The nozzle assembly can include multiple baffle plates defining multiple nozzle chambers, with each baffle plate including an orifice having a predetermined effective orifice diameter through which the optical fiber passes. Each nozzle chamber can be configured to sequentially change a nozzle chamber pressure between the reduced pressure $P_{reduced}$ and the ambient pressure $P_{ambient}$ according to a pressure change ratio r defined by Formula (I):

$$r = 1 - \left(\frac{P_{reduced}}{P_{ambient}}\right)^{\frac{1}{n}} \quad (I)$$

where n is the number of nozzle chambers+1 in the nozzle assembly (i.e., one more than the number of nozzle chambers), $P_{reduced}$ is the reduced pressure in the treating zone, and $P_{ambient}$ is the ambient pressure. The nozzle assembly can be configured to reduce a flow of gas (e.g., air) from the external ambient to the treatment device into the treating zone as the optical fiber passes into and/or out of the treating zone. Reducing the flow of gas into the treating zone can include reducing an amount of gas flowing into the treating zone and/or reducing a velocity of the gas flowing into the treating zone. In some aspects, reducing the flow of external gas into the treating zone includes reducing an air jet flowing into the treating zone that could alter a cooling rate of the optical fiber and/or cause vibrations that could result in undesirable contact between the optical fiber and surrounding components.

Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

FIG. 1 illustrates a schematic of a system 10 for processing an optical fiber according to aspects of the present disclosure. The system 10 can include a draw furnace 20 configured to heat a fiber preform 22 to form an optical fiber 24, at least one positioner 30, a treatment device 34 disposed downstream of the draw furnace 20 and including a treating zone 36, and a nozzle assembly 40.

The draw furnace 20 is configured to heat the fiber preform 22 such that the optical fiber 24 can be drawn from the fiber preform 22. The draw furnace 20 can be configured to heat the fiber preform 22 to a temperature greater than the softening point of the material such that the fiber preform 22 can be drawn into the optical fiber 24. Optionally, the fiber preform 22 can include materials to form an optical fiber 22 having a core and a cladding. The fiber preform 22 may include a glass composition, such as a silica-based glass composition, and optionally include regions having different compositions. For example, in some aspects, the fiber preform 22 can include regions of a first silica-based glass composition corresponding to a core region of the optical fiber 24 and regions of a second silica-based glass composition, different than the first silica-based glass composition, corresponding to a cladding region of the optical fiber 24. The fiber preform 22 can include any suitable glass material or other material for forming an optical fiber 24 having the desired properties. In one example, the fiber preform 22 includes a silica glass material that optionally includes dopants. For example, the fiber preform 22 can include a silica glass material to form a clad mainly formed of a silica glass and a doped silica glass material to form a core region. In some examples, the fiber preform 22 can include a silica glass material to form a core mainly formed of a silica glass and a doped silica glass material to form a cladding. Dopants in silica glass include index-raising dopants (e.g., geranium) and index-lowering dopants (e.g., fluorine).

The draw furnace 20 can be operated in a manner typically used for drawing optical fibers at a temperature greater than a softening temperature of the glass composition in order to form the optical fiber 24. For example, in some aspects, the draw furnace 20 can be configured to maintain the fiber preform 22 at a temperature greater than 2000° C., although it is understood that the temperature may vary based on the components of the glass composition and the desired properties of the optical fiber 24 to be formed.

The system 10 can be configured to draw an optical fiber 24 having a desired diameter. For example, the optical fiber 24 can have a diameter of about 100 micrometers to about 150 micrometers. In some examples, the optical fiber 24 can have a diameter of about 100 µm, about 110 µm, about 120 µm, about 130 µm, about 140 µm, about 150 µm, or any value between these values.

As illustrated in FIG. 1, the at least one positioner 30 is disposed downstream of the draw furnace 20 and upstream of the treatment device 34. The positioner 30 can be configured to help reduce variability in the process pathway as the optical fiber 24 travels through the system 10. The optical fiber 24 may be moved horizontally and/or vertically through the system 10 and the at least one positioner 30 can be configured to stabilize the positioning of the optical fiber 24, aid in transitioning the optical fiber 24 through the various treatment processes and components of the system 10, and/or change a direction of travel of the optical fiber 24. The positioner 30 can be located upstream of the treatment device 34, as illustrated, or disposed in one or more alternative locations along the process pathway. Additional optional positioners, such as positioner 42, can be disposed in one or more locations along the process pathway to facilitate passage of the optical fiber 24 through the various treatment processes and components of the system 10. The positioners 30 and 42 can include one or more fluid bearing devices 44, although it is understood that different types of positioners can be used in place of or in combination with the fluid bearing devices 44.

The system 10 can also include a coating unit 46 downstream of the treatment device 34 that is configured to apply a coating to the optical fiber 24 to form a coated optical fiber 48. While only one coating unit 46 is illustrated, the system 10 can include one or more additional coating units to apply a coating to the optical fiber 24. The system 10 can also include a drawing mechanism 50 to apply tension to the optical fiber 24 as it is drawn through the treatment processes and components of the system 10.

The system 10 can optionally include a slow cooling device 52 disposed downstream of the draw furnace 20 and upstream of the treatment device 34. The slow cooling device 52 can be configured to cool the optical fiber 24 at a rate that is slower than a cooling rate of the optical fiber in air at 25° C. and 1 atmosphere (atm) (referred to herein as the "ambient cooling rate"). The slow cooling device 52, when present, can be positioned immediately adjacent an exit 54 of the draw furnace 20 or spaced from the exit 54, as illustrated. The slow cooling device 52 can be configured to slow cool the optical fiber 24 to maintain a temperature of the optical fiber 24 within a predetermined temperature range, such as near a glass transition temperature $T_g$ of the material of the optical fiber 24 or within a predetermined temperature range above and/or below the glass transition temperature $T_g$ of the material of the optical fiber 24. For example, for a silica-based glass optical fiber, the slow cooling device 52 can be configured to maintain a temperature of the optical fiber 24 within a predetermined temperature range above the glass transition temperature, such as 1200° C. to 1700° C. or a predetermined temperature range below the glass transition temperature, such as 1000° C. to 1200° C.

The treatment device 34 can be configured to cool the optical fiber 24 at a reduced pressure below ambient pressure and at a rate that is slower than a cooling rate of the optical fiber in air at 25° C. and 1 atmosphere (atm). As used herein, the term "ambient pressure" refers to a pressure of the environment in which the system 10 is located. It is understood that there will be some variability in ambient pressure based on the elevation and atmospheric conditions of the environment in which the system 10 is located. For example, at sea level, ambient pressure is considered 1 atm or 101.3 kPa, which may vary depending on atmospheric conditions. The treatment device 34 can include a chamber 60 having a fiber inlet 62 and a fiber outlet 64. The chamber 60 may at least in part define the treating zone 36 which is disposed between the fiber inlet 62 and the fiber outlet 64. The treatment device 34 can be fluidly coupled with a vacuum system 70 through a vacuum port 72. The vacuum system 70 can be configured to reduce a pressure within the treatment device 34 to less than ambient pressure. The vacuum system 70 can include one or more vacuum pumps, Venturi device, or other component configured to reduce the pressure within the chamber 60.

In some aspects, the vacuum system 70 is configured to reduce a pressure in the treating zone 36 to less than 1 atmosphere (atm) or less than 101.3 kilopascals (kPa) (where 1 atm=101.3 kPa). In some examples, the reduced pressure in the treatment device 34 is less than 0.9 atm (91.2 kPa), less than 0.8 atm (81.1 kPa), less than 0.5 atm (50.7 kPa), less than 0.3 atm (30.4 kPa), or less than 0.1 atm (10.1 kPa). For example, in some aspects, the vacuum system 70 may be configured to produce a reduced pressure within the treatment device 34 of from about 0.005 atm (about 0.5 kPa) to about 1 atm (about 101.3 kPa), from about 0.005 atm (about 0.5 kPa) to about 0.8 atm (about 81.1 kPa), from about 0.005 atm (about 0.5 kPa) to about 0.5 atm (about 50.6 kPa), from about 0.005 atm (about 0.5 kPa) to about 0.3 atm (about 30.4 kPa), from about 0.005 atm (about 0.5 kPa) to about 0.1 atm (about 10.1 kPa), from about 0.01 atm (about 1.01 kPa) to about 1 atm (about 101.3 kPa), from about 0.01 atm (about 1.01 kPa) to about 0.8 atm (about 81.1 kPa), from about 0.01 atm (about 1.01 kPa) to about 0.5 atm (about 50.6 kPa), from about 0.01 atm (about 1.01 kPa) to about 0.3 atm (about 30.4 kPa), from about 0.01 atm (about 1.01 kPa) to about 0.1 atm (about 10.1 kPa), from about 0.05 atm (about 5.07 kPa) to about 1 atm (about 101.3 kPa), from about 0.05 atm (about 5.07 kPa) to about 0.8 atm (about 81.1 kPa), from about 0.05 atm (about 5.07 kPa) to about 0.5 atm (about 50.6 kPa), from about 0.05 atm (about 5.07 kPa) to about 0.3 atm (30.4 kPa), or from about 0.05 atm (about 5.07 kPa) to about 0.1 atm (10.1 kPa). For example, the reduced pressure can be about 0.005 atm (about 0.5 kPa), about 0.01 atm (about 1.01 kPa), about 0.1 atm (about 10.1 kPa), about 0.2 atm (about 20.3 kPa), about 0.3 atm (about 30.4 kPa), about 0.4 atm (about 40.5 kPa), about 0.5 atm (about 50.6 kPa), about 0.6 atm (about 60.8 kPa), about 0.7 atm (about 70.9 kPa), about 0.8 atm (about 81.1 kPa), or any value between these values. In some aspects, the pressure in the treating zone 36 is selected based at least in part on a desired cooling rate of the optical fiber 24.

While the vacuum port 72 is illustrated in FIG. 1 as being located in a downstream region of the treating zone 36, adjacent to the fiber outlet 64, the vacuum port 72 can be located anywhere along the treatment device 34. Optionally, the system 10 can include multiple vacuum ports 72 to facilitate reducing the pressure within the treating zone 36. The at least one positioner 30 can optionally be disposed within an enclosure 76 that is fluidly coupled with the treatment device 34 (as shown in FIG. 1) or with the vacuum system 70 such that the optical fiber 24 is passed through the positioner 30 at a reduced pressure relative to ambient pressure.

In some aspects, the treatment device 34 can be fluidly coupled with a working gas source 78 through a gas port 80 for providing a working gas other than ambient air into the treating zone 36. The working gas can be an inert gas that does not react with the material of the optical fiber 24 at the process temperature and/or pressure. Examples of suitable inert working gases include helium, neon, argon, xenon, nitrogen, krypton, and combinations thereof. In some examples, the working gas may be a gas having a thermal conductivity that is less than a thermal conductivity of air. Without being limited by theory, it is believed that the presence of a working gas having a thermal conductivity less than the thermal conductivity of air may reduce a rate of heat conduction away from the optical fiber 24 within the treating zone 36 compared to a rate of heat conduction in air.

A reheating device 82 can be positioned upstream of the treating zone 36 and configured to reheat the optical fiber 24 prior to entering the treating zone 36 of the treatment device 34. The reheating device 82 can be positioned downstream of the fiber inlet 62, as shown in FIG. 1, such that the optical fiber 24 is heated after entering the treatment device 34. Positioning the reheating device 82 downstream of the fiber inlet 62 allows for the optical fiber 24 to be heated at a reduced pressure relative to ambient pressure. Optionally, the reheating device 82 can be positioned upstream of the fiber inlet 62 to heat the optical fiber 24 prior to the optical fiber 24 entering the treatment device 34. The reheating device 82 may be configured to reheat the optical fiber 24 to a temperature at or within a predetermined temperature range above and/or below a glass transition temperature $T_g$ of the optical fiber 24. For example, in some embodiments, the reheating device 82 may be operable to reheat the optical fiber 24 to a temperature of from 1000° C. to 1700° C. For example, in some embodiments, the reheating device 82 may be operable to reheat the optical fiber 24 to a temperature of from 1000° C. to 1600° C., from 1000° C. to 1500° C., from 1200° C. to 1700° C., from 1200° C. to 1600° C., from 1200° C. to 1500° C., from 1300° C. to 1700° C., from 1300° C. to 1600° C., or even from 1300° C. to 1500° C.

The reheating device 82 may be any suitable type of reheating device capable of reheating the optical fiber 24 in a short period of time. In some embodiments, the reheating device 82 may include at least one of a laser heating device, flame heating device, radiant heating device, other type of heating device, or combinations of these.

Referring to FIGS. 1-6, the nozzle assembly 40 can be disposed at the fiber outlet 64 to facilitate passage of the optical fiber 24 from the reduced pressure environment of the treating zone 36 to ambient pressure. Without being limited by any theory, as the optical fiber 24 enters and/or exits the treatment device 34, the optical fiber 24 may become entrained in a high velocity air jet. This entrained air jet may result in ambient air entering the treatment device 34 through the fiber inlet 62 and/or the fiber outlet 64, respectively, at a high velocity that may be supersonic. The ambient air entering the treatment device 34 can result in undesirable quenching of the optical fiber 24 through convective cooling and may increase the risk of vibration of the optical fiber 24. The high velocity air may cause the optical fiber 24 to vibrate and move laterally in the XY plane (which is a plane normal to the direction of fiber draw along the process pathway). Excessive lateral vibrations could cause the optical fiber 24 to contact the fiber inlet 62 and/or fiber outlet 64 as the optical fiber 24 passes through the treatment device 34, which could affect the physical properties of the optical fiber 24 and possibly interrupt the fiber drawing process.

As the optical fiber 24 moves between the reduced pressure environment of the treating zone 36 and ambient pressure, high pressure regions can form in the exhaust around the optical fiber 24 within the boundary of the air jet. Mach disks can form in these high pressure regions through a repeating and decaying series of shocks and expansions caused by the difference in air pressure around the entrained air jet and the reduced pressure environment of the treatment device 34, resulting in shock waves that can be supersonic. For example, an optical fiber exiting a theoretical tube having a reduced pressure environment of 0.2 atm (20.3 kPa) and a 3 mm diameter exit opening has been estimated to be entrained by a 2.3 Mach number air jet. As used herein, Mach number refers to the ratio of flow velocity with respect to the boundary through which the optical fiber is traveling to the local speed of sound. A Mach number of 1 indicates that the flow velocity is equal to the speed of sound, whereas a Mach number of 1.5 indicates that the flow velocity is 50% faster than the speed of sound (i.e., supersonic).

Aspects of the present disclosure include a nozzle assembly 40 that is configured to reduce a flow of ambient air into the treatment device 34 by reducing a velocity and/or an amount of the incoming air jet as the optical fiber 24 enters and/or exits the treatment device 34. Aspects of the present disclosure can also include a nozzle assembly 40 that is configured to reduce vibrations of the optical fiber 24 induced by the entrained air jet as the optical fiber 24 enters and/or exits the treatment device 34.

The nozzle assembly 40 of the present disclosure can be configured to facilitate passage of the optical fiber 24 between a reduced pressure environment $P_{reduced}$ and an ambient pressure environment $P_{ambient}$, either from a reduced pressure environment $P_{reduced}$ to an ambient pressure environment $P_{ambient}$ and/or from an ambient pressure environment $P_{ambient}$ to a reduced pressure environment $P_{reduced}$. While the nozzle assembly 40 is described with respect to the example nozzle assemblies of FIGS. 2-6 in the context of facilitating passage of the optical fiber 24 from the reduced pressure environment $P_{reduced}$ of the treatment device 34 to ambient pressure $P_{ambient}$ at the fiber outlet 64, the nozzle assembly 40 can also be used to facilitate passage of the optical fiber 24 from an ambient pressure environment $P_{ambient}$ to a reduced pressure environment $P_{reduced}$ of the treatment device 34. For example, the nozzle assembly 40 can be disposed at the fiber inlet 62 of the treatment device 34 to facilitate passage of the optical fiber 24 from ambient pressure $P_{ambient}$ into the reduced pressure environment $P_{reduced}$ of the treating zone 36. For example, when the nozzle assembly 40 is provided downstream of an area of reduced pressure $P_{reduced}$ (e.g., the treatment device 34) to facilitate passage of the optical fiber 24 from ambient pressure $P_{ambient}$ to a reduced pressure environment $P_{reduced}$, the orientation of the baffle plates 88 is reversed from that shown in FIGS. 2-6 such that the wide end of the frustum forming the baffle plate 88 (opposite the orifice 92) is oriented toward the zone of reduced pressure $P_{reduced}$. In some aspects, the nozzle assembly 40 can be used at the fiber inlet 62, the fiber outlet 64, or both the fiber inlet 62 and the fiber outlet 64 to facilitate passage of the optical fiber 24 between a reduced pressure environment $P_{reduced}$ and an ambient pressure environment $P_{ambient}$. It is also within the scope of the present disclosure to utilize the nozzle assembly 40 at other positions upstream and/or downstream of the treatment device 34 wherever the optical fiber 24 travels between a reduced pressure environment $P_{reduced}$ and an ambient pressure environment $P_{ambient}$.

For example, when the positioner 30 or the enclosure 76 is maintained at a reduced pressure, the nozzle assembly 40 can be disposed at an inlet of the positioner 30 or the enclosure 76 to facilitate passage of the optical fiber from ambient pressure to the reduced pressure environment within the positioner 30 or the enclosure 76. In another example, when the positioner 42 is enclosed and maintained at a reduced pressure, the nozzle assembly 40 can be disposed at an outlet of the positioner 42 to facilitate passage of the optical fiber 24 from the reduced pressure environment within the positioner 42 to ambient pressure. The nozzle assembly 40 can be used at any one or any combination of the fiber inlet 62, the fiber outlet 64, locations upstream of the treatment device 34, and locations downstream of the treatment device 34.

Figure 2:
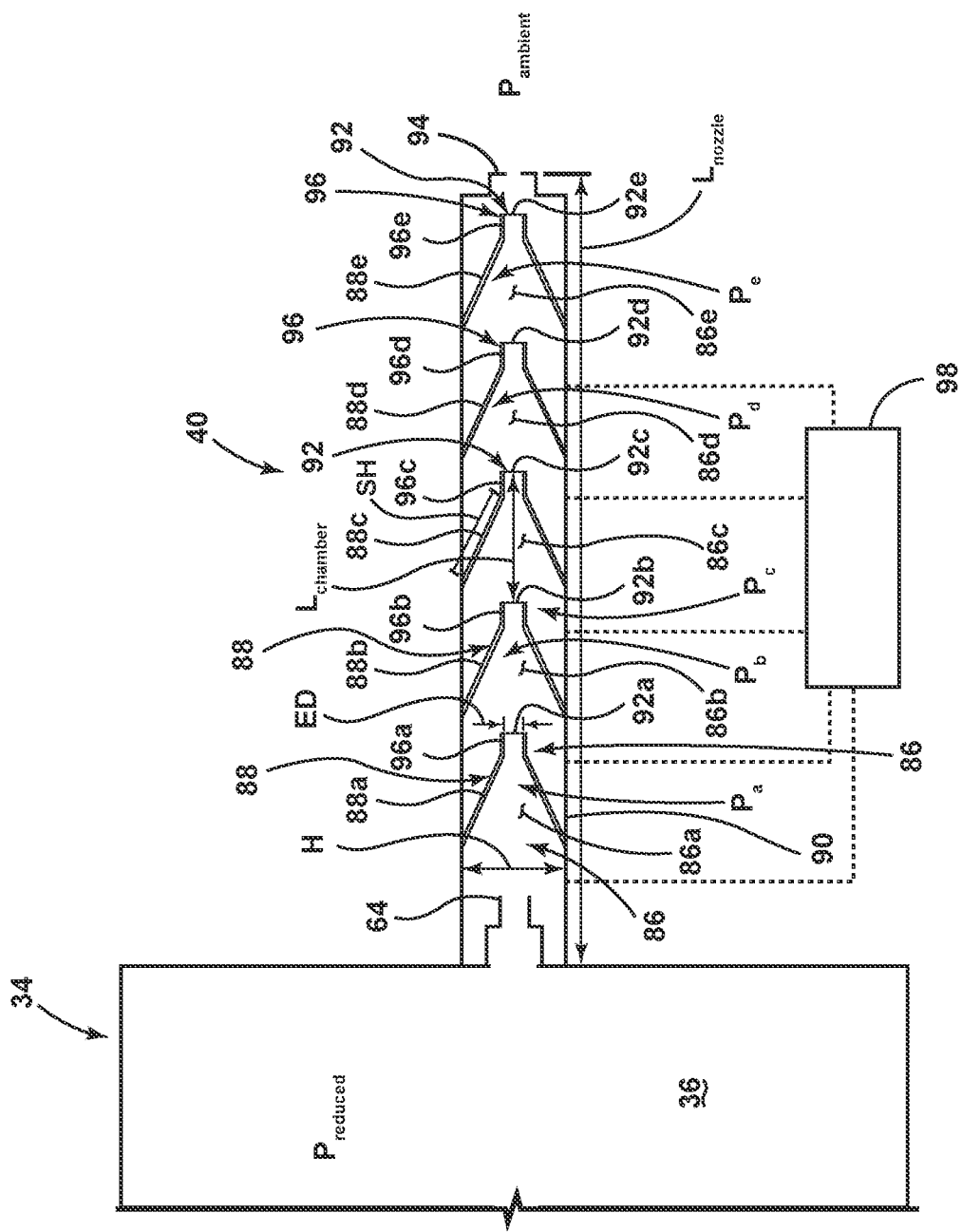
FIG. 2 is a cross-sectional schematic view of an exemplary nozzle assembly, according to aspects of the present disclosure.
Figure 3:
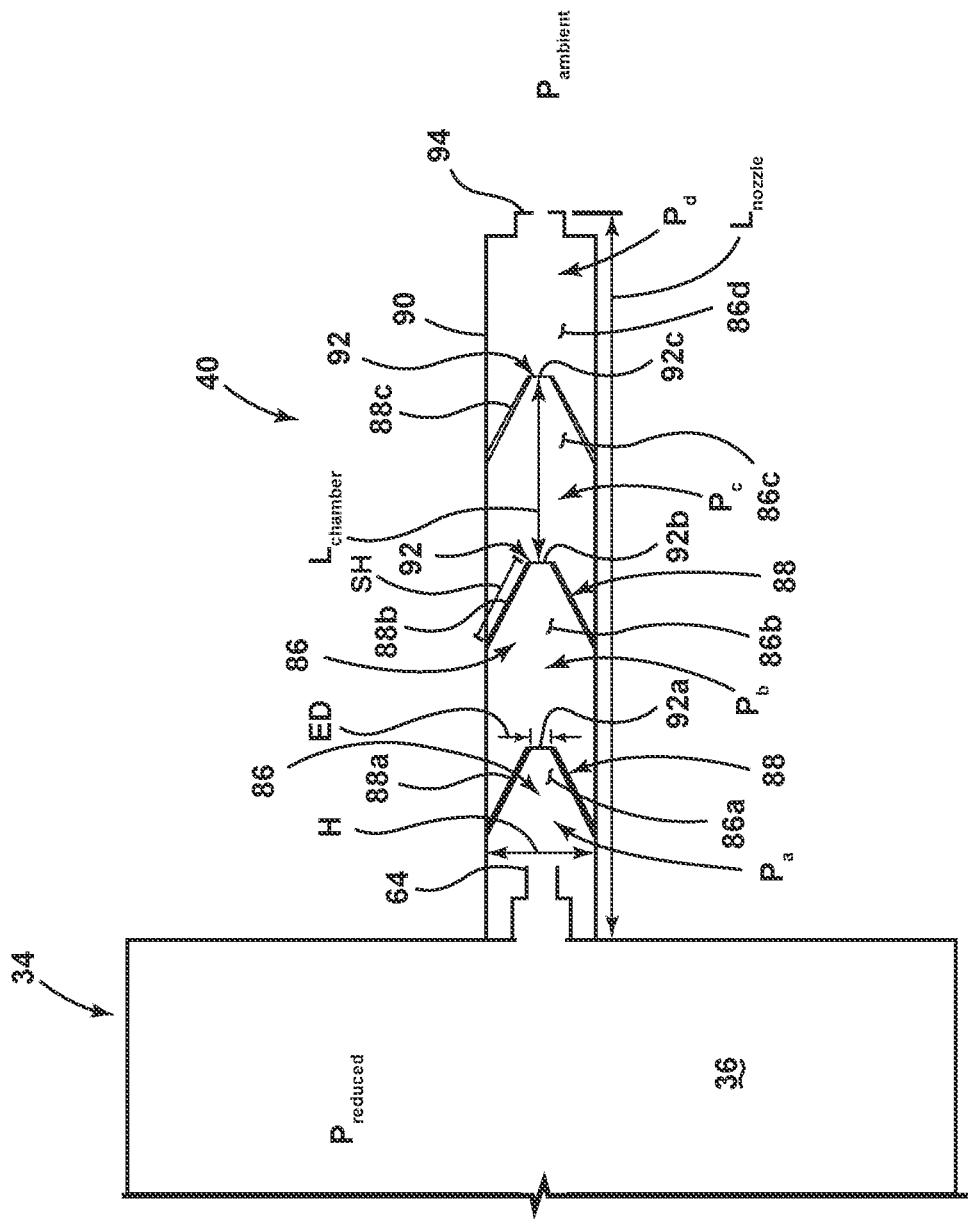
FIG. 3 is a cross-sectional schematic view of an exemplary nozzle assembly, according to aspects of the present disclosure.
Figure 4:
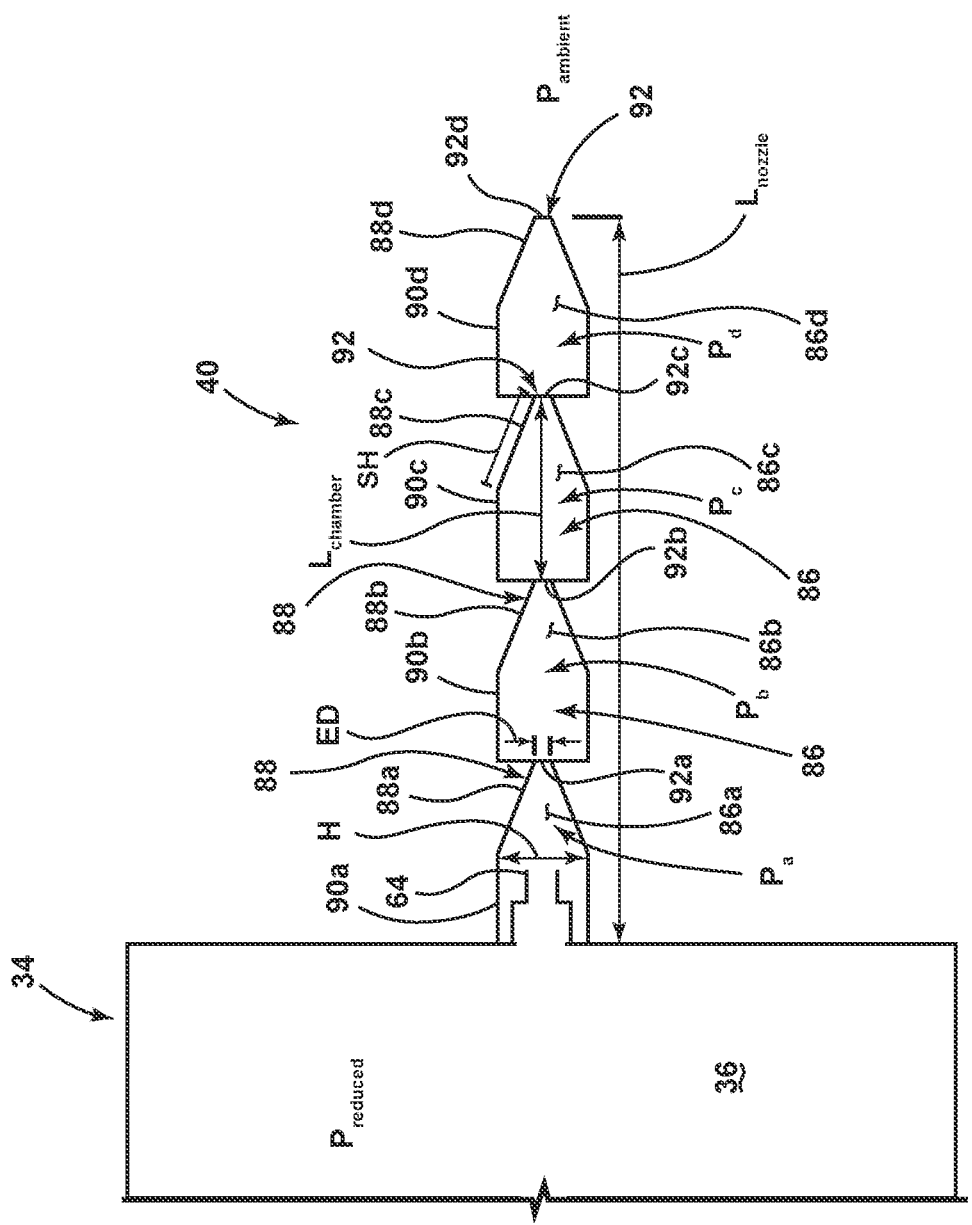
FIG. 4 is a cross-sectional schematic view of an exemplary nozzle assembly, according to aspects of the present disclosure.
Figure 5:
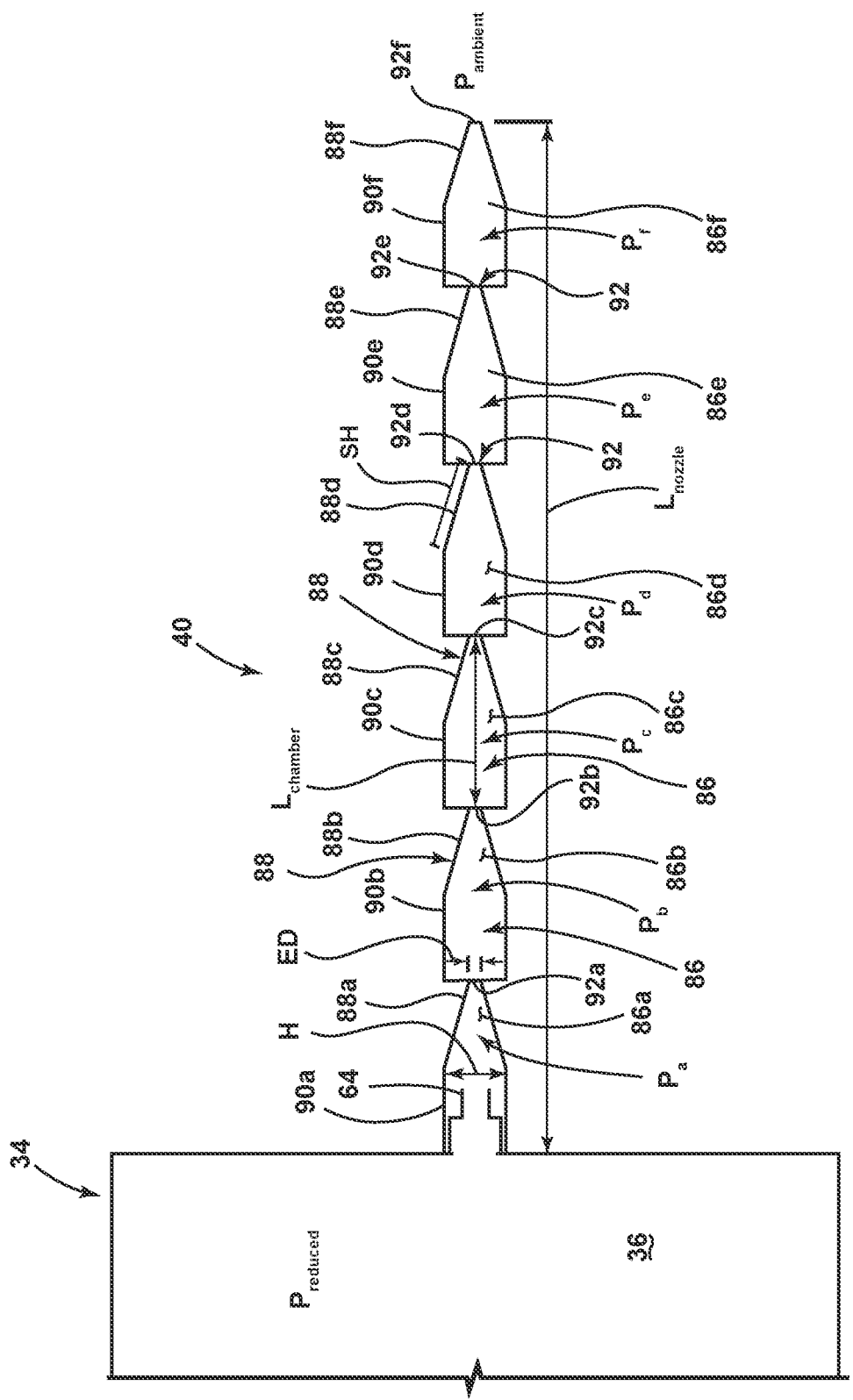
FIG. 5 is a cross-sectional schematic view of an exemplary nozzle assembly, according to aspects of the present disclosure.
Figure 6:
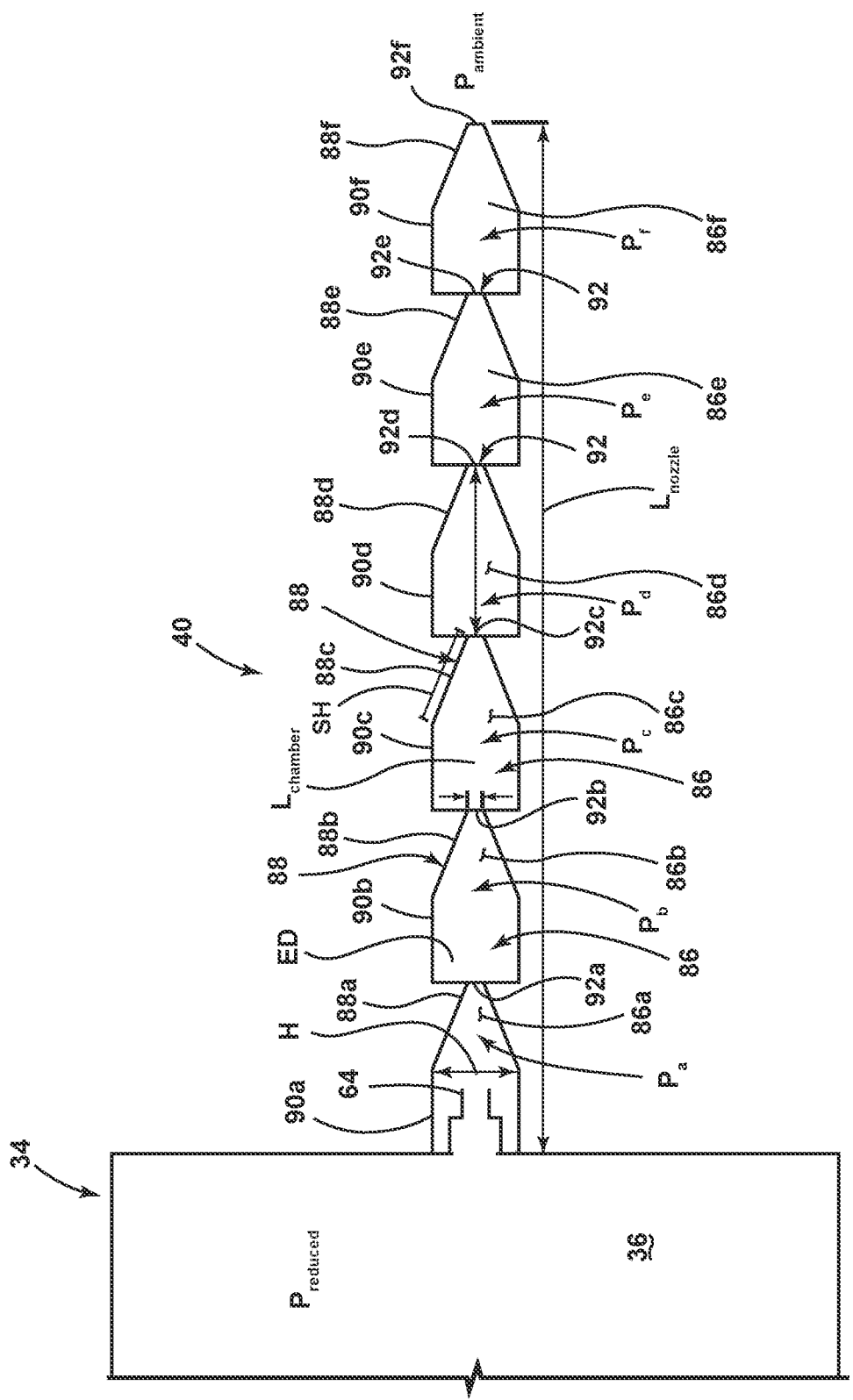
FIG. 6 is a cross-sectional schematic view of an exemplary nozzle assembly, according to aspects of the present disclosure.

Referring to FIGS. 2-6, the nozzle assembly 40 includes a plurality of nozzle chambers 86 defined at least in part by a plurality of baffle plates 88, with the suffix a, b, c, etc. . . . , used to identify each individual one of the plurality of nozzle chambers 86 and the plurality of baffle plates 88. As used herein with respect to the components of the nozzle assembly 40, the suffix a, b, c, etc. . . . , is used to identify multiples of a component for the sake of discussion and is not intended to limit the number of multiples of a given component, unless explicitly stated. Multiples of a given component can be referred to as a group using the reference numeral with or without a suffix. In the example of FIG. 2, the nozzle assembly 40 includes five nozzle chambers 86a, 86b, 86c, 86d, and 86e defined at least in part by five baffle plates 88a, 88b, 88c, 88d, and 88e. The nozzle assembly 40 can include fewer nozzle chambers 86 and baffle plates 88, as shown in FIGS. 3 and 4, or more nozzle chambers 86 and baffle plates 88, as shown in FIGS. 5 and 6. The example nozzle assembly 40 of FIG. 3 includes three nozzle chambers 86a, 86b, and 86c defined at least in part by three baffle plates 88a, 88b, and 88c. In some aspects, with respect to the example nozzle assemblies 40 of FIGS. 2 and 3, the space between the last baffle plate 88 and the nozzle outlet 94 may be considered a baffle chamber 88 for the purposes of sequentially decreasing/increasing the pressure between the reduced pressure $P_{reduced}$ and ambient pressure $P_{ambient}$ or may be in equilibrium with ambient pressure $P_{ambient}$. For example, the nozzle assembly 40 of FIG. 3 including three baffle plates 88a-c can be considered as having four nozzle chambers 86a-d that sequentially decrease/increase the pressure between the reduced pressure $P_{reduced}$ and ambient pressure $P_{ambient}$. The example nozzle assembly 40 of FIG. 4 includes four nozzle chambers 86a, 86b, 86c, and 86d defined at least in part by four baffle plates 88a, 88b, 88c, and 88d. The example nozzle assembly 40 of FIGS. 5 and 6 include six nozzle chambers 86a, 86b, 86c, 86d, 86e, and 86f defined at least in part by six baffle plates 88a, 88b, 88c, 88d, 88e, and 88f. In some aspects, the nozzle assembly 40 can include n number of nozzle chambers 86 and m number of baffle plates 88, where n and m may be the same or different and where n and m are greater than 2, greater than 3, greater than 4, greater than 5, greater than 6, greater than 7, greater than 8, greater than 9, greater than 10, or greater than 15. In some examples, n and m are 2 to 15, 2 to 10, 2 to 9, 2 to 8, 2 to 7, 2 to 6, 2 to 5, 2 to 4, 2 to 3, 3 to 15, 3 to 10, 3 to 9, 3 to 8, 3 to 7, 3 to 6, 3 to 5, 3 to 4, 4 to 15, 4 to 10, 4 to 9, 4 to 8, 4 to 7, 4 to 6, 4 to 5, 5 to 15, 5 to 10, 5 to 9, 5 to 8, 5 to 7, 5 to 6, 6 to 15, 6 to 10, 6 to 9, 6 to 8, 6 to 7, 7 to 15, 7 to 10, 7 to 9, 7 to 8, 8 to 15, 8 to 10, 8 to 9, 9 to 15, 9 to 10, or 10 to 15. In some examples, n and m are 2, 3, 4, 5, 6, 7, 8, 9, 10, 11, 12, 13, 14, 15, or any value between these values.

The nozzle assembly 40 can include a chamber outer wall or enclosure 90 which, together with the baffle plates 88, can define the nozzle chambers 86. In the example nozzle assembly 40 of FIGS. 2 and 3, the nozzle assembly 40 includes an enclosure 90 which encloses all of the nozzle chambers 86. In the example of FIGS. 4-6, each nozzle chamber 86 is surrounded by an individual enclosure 90a, 90b, 90c, 90d (FIG. 4) or 90a, 90b, 90c, 90d, 90e, and 90f (FIGS. 5-6). Additional housings or enclosures may surround all or a portion of the nozzle assembly 40, for example to protect the nozzle assembly 40, insulate the nozzle assembly 40, facilitate coupling the nozzle assembly 40 with a vacuum system, and/or to provide structural support to the nozzle assembly 40 without deviating from the scope of the present disclosure.

Still referring to FIGS. 2-6, each of the baffle plates 88 can include a respective nozzle orifice 92 through which the optical fiber 24 passes as the optical fiber 24 travels through the nozzle assembly 40 to a nozzle outlet 94. In the exemplary nozzle assembly 40 shown in FIG. 2, each baffle plate 88a, 88b, 88c, 88d, and 88e includes a lip 96a, 96b, 96c, 96d, and 96e projecting from a distal end of each baffle plate 88a, 88b, 88c, 88d, and 88e to define each respective nozzle orifice 92a, 92b, 92c, 92d, and 92e. Alternatively, in some examples of the nozzle assembly 40, such as the example nozzle assemblies of FIGS. 3-6, the baffle plates 88 do not include a lip 96.

The nozzle assembly 40 can have a nozzle length $L_{nozzle}$ defined as a distance between a distal end of the first nozzle chamber 86a and the nozzle outlet 94. In some examples of the nozzle assembly 40, such as those illustrated in FIGS. 2 and 3, the nozzle outlet 94 is formed in an end wall of the nozzle assembly 40 that is not formed from a baffle plate 88. In some examples of the nozzle assembly 40, such as those illustrated in FIGS. 4-6, the end of the nozzle assembly 40 is formed by the last baffle plate 88 such that the nozzle orifice 92 of the last nozzle chamber 86 forms the nozzle outlet 94. Each nozzle chamber 86 can have a nozzle height H defined as a distance between opposing sides of the enclosure 90 and a nozzle chamber length $L_{chamber}$ defined as a distance between consecutive nozzle orifices 92.

Each nozzle orifice 92 can be defined by a cross-sectional area A and an effective diameter ED. The effective diameter ED of the nozzle orifice 92 can be defined as a maximum distance between opposing sides of the baffle plate 88 defining the nozzle orifice 92 in the X/Y plane (i.e., the plane orthogonal to the draw direction of the optical fiber 24). The effective diameter ED of each nozzle orifice 92 may be the same or different. The nozzle orifice 92 may have a symmetrical or asymmetrical shape. In some aspects, the nozzle orifice 92 has a circular, oval, rectangular, square, triangular, or other symmetrical or asymmetrical geometric cross-sectional shape. In some examples, the effective diameter ED of a nozzle orifice 92 is based on a predetermined cross-sectional area A and cross-sectional shape of the nozzle orifice 92. For example, for a circular nozzle orifice 92 having a diameter d, the effective diameter ED is related to the cross-sectional area A according to the relationship: $d=ED=2*\sqrt{(A/\pi)}$. For a non-circular nozzle orifice 92, the effective diameter ED can be based on the diameter of an imaginary circle having a cross-sectional area A equivalent to the cross-sectional area of the non-circular nozzle orifice. For example, for a nozzle orifice having a square cross-sectional shape with an edge length a, the effective diameter ED can be determined according to the relationship: $ED=(2*a)/\sqrt{\pi}\approx1.128*a$. For a nozzle orifice having an equilateral triangular cross-sectional shape with an edge length a, the effective diameter ED can be determined according to the relationship: $ED=2*\sqrt{(a/\pi)}\approx0.743*a$.

The baffle plates 88 can have a generally frustum-shaped cross-sectional shape having a slant height SH that can be determined based on the other features of the nozzle assembly 40, including the nozzle length $L_{nozzle}$, the number of nozzle chambers n, the nozzle height H, the effective diameter ED of each nozzle orifice 92, and the nozzle chamber length $L_{chamber}$. The cross-sectional shape of the baffle plates 88 can be a frustum of a cone, a pyramid, or other geometrical shape based on the cross-sectional shape of the corresponding nozzle orifice 92.

The nozzle assembly 40 can have a nozzle length $L_{nozzle}$ selected to facilitate passage of the optical fiber 24 between the reduced pressure environment $P_{reduced}$ of the treating zone 36 and the ambient pressure zone $P_{ambient}$ by sequentially changing a nozzle chamber pressure in each nozzle chamber 86 of the nozzle assembly 40. In some aspects, the nozzle length $L_{nozzle}$ can be selected in concert with other features of the nozzle assembly 40, such as the number of nozzle chambers n, the nozzle height H, the effective diameter ED of each nozzle orifice 92, and the nozzle chamber length $L_{chamber}$ to decrease and/or shift a location of a maximum Mach number of the air jet entraining the optical fiber 24 as it travels through the nozzle assembly 40. For example, the nozzle assembly 40 can have a nozzle length $L_{nozzle}$ greater than about 50 millimeters (mm), greater than 60 mm, greater than 70 mm, greater than 80 mm, greater than 90 mm, greater than 100 mm, greater than 110 mm, greater than 120 mm, greater than 130 mm, greater than 140 mm, greater than 150 mm, greater than 160 mm, greater than 170 mm, greater than 180 mm, greater than 190 mm, greater than 200 mm, greater than 300 mm, greater than 400 mm, or greater than 500 mm. In some aspects, the nozzle assembly 40 can have a nozzle length $L_{nozzle}$ of about 50 mm to about 500 mm, about 50 mm to about 400 mm, about 50 mm to about 300 mm, about 50 mm to about 200 mm, about 50 mm to about 150 mm, about 50 mm to about 100 mm, about 60 mm to about 500 mm, about 60 mm to about 400 mm, about 60 mm to about 300 mm, about 60 mm to about 200 mm, about 60 mm to about 150 mm, about 60 mm to about 100 mm, about 100 mm to about 500 mm, about 100 mm to about 400 mm, about 100 mm to about 300 mm, about 100 mm to about 200 mm, about 100 mm to about 150 mm. In some aspects, the nozzle assembly 40 can have a nozzle length $L_{nozzle}$ of about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm or any value between these values.

The nozzle assembly 40 can have a nozzle height H selected to facilitate passage of the optical fiber 24 between the reduced pressure environment $P_{reduced}$ of the treating zone 36 and the ambient pressure zone $P_{ambient}$ by sequentially changing a nozzle chamber pressure in each nozzle chamber 86 of the nozzle assembly 40. In some aspects, the nozzle assembly 40 can have a nozzle height H that is selected in concert with other features of the nozzle assembly 40, such as the number of nozzle chambers n, the nozzle length $L_{nozzle}$, nozzle chamber length $L_{chamber}$, and the effective diameter ED of each nozzle orifice 92 to decrease and/or shift a location of a maximum Mach number of the air jet entraining the optical fiber 24 as it travels through the nozzle assembly 40. For example, the nozzle assembly 40 can have a nozzle height H of greater than 5 mm, greater than 10 mm, greater than 15 mm, greater than 20 mm, greater than 25 mm, or greater than 30 mm. In some aspects, the nozzle assembly 40 has a nozzle height H of about 5 mm to 30 mm, about 5 mm to about 25 mm, about 5 mm to about 20 mm, about 5 mm to about 15 mm, about 5 mm to about 10 mm, about 10 mm to about 30 mm, about 10 mm to about 25 mm, about 10 mm to about 20 mm, about 10 mm to about 15 mm, about 15 mm to about 30 mm, about 15 mm to about 25 mm, about 15 mm to about 20 mm, about 20 mm to about 25 mm, or about 20 mm to about 30 mm. In some aspects, the nozzle height H is about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, or any value between these values.

The nozzle assembly 40 can have a nozzle chamber length $L_{chamber}$ selected to facilitate passage of the optical fiber 24 between the reduced pressure environment $P_{reduced}$ of the treating zone 36 and the ambient pressure zone $P_{ambient}$ by sequentially changing a nozzle chamber pressure in each nozzle chamber 86 of the nozzle assembly 40. In some aspects, the nozzle assembly 40 can have a nozzle chamber length $L_{chamber}$ that is selected in concert with other features of the nozzle assembly 40, such as the number of nozzle chambers n, the nozzle length $L_{nozzle}$, the nozzle height H, and the effective diameter ED of each nozzle orifice 92 to decrease and/or shift a location of a maximum Mach number of the air jet entraining the optical fiber 24 as it travels through the nozzle assembly 40. In some examples, the nozzle chamber length $L_{chamber}$ is greater than 3 mm, greater than 5 mm, greater than 10 mm, greater than 15 mm, greater than 20 mm, greater than 25 mm, greater than 30 mm, greater than 35 mm, greater than 40 mm, greater than 45 mm, greater than 50 mm, greater than 55 mm, greater than 60 mm, greater than 70 mm, greater than 80 mm, greater than 90 mm, greater than 100 mm, greater than 110 mm, greater than 120 mm, greater than 150 mm, or greater than 200 mm. In some examples the nozzle chamber length $L_{chamber}$ is about 3 mm to about 200 mm, about 3 mm to about 150 mm, about 3 mm to about 120 mm, about 3 mm to about 110 mm, about 3 mm to about 100 mm, about 3 mm to about 90 mm, about 3 mm to about 80 mm, about 3 mm to about 70 mm, about 3 mm to about 60 mm, about 3 mm to about 55 mm, about 3 mm to about 50 mm, about 3 mm to about 45 mm, about 3 mm to about 40 mm, about 3 mm to about 35 mm, about 3 mm to about 35 mm, about 3 mm to about 30 mm, about 3 mm to about 25 mm, about 3 mm to about 20 mm, about 3 mm to about 15 mm, about 3 mm to about 10 mm, about 10 mm to about 200 mm, about 10 mm to about 150 mm, about 10 mm to about 120 mm, about 10 mm to about 110 mm, about 10 mm to about 100 mm, about 10 mm to about 90 mm, about 10 mm to about 80 mm, about 10 mm to about 70 mm, about 10 mm to about 60 mm, about 10 mm to about 55 mm, about 10 mm to about 50 mm, about 10 mm to about 45 mm, about 10 mm to about 40 mm, about 10 mm to about 35 mm, about 10 mm to about 35 mm, about 10 mm to about 30 mm, about 10 mm to about 25 mm, about 10 mm to about 20 mm, about 10 mm to about 15 mm, about 15 mm to about 200 mm, about 15 mm to about 150 mm, about 15 mm to about 120 mm, about 15 mm to about 110 mm, about 15 mm to about 100 mm, about 15 mm to about 90 mm, about 15 mm to about 80 mm, about 15 mm to about 70 mm, about 15 mm to about 60 mm, about 15 mm to about 55 mm, about 15 mm to about 50 mm, about 15 mm to about 45 mm, about 15 mm to about 40 mm, about 15 mm to about 35 mm, about 15 mm to about 35 mm, about 15 mm to about 30 mm, about 15 mm to about 25 mm, about 15 mm to about 20 mm, about 20 mm to about 200 mm, about 20 mm to about 150 mm, about 20 mm to about 100 mm, or about 20 mm to about 50 mm. In some examples, the nozzle chamber length $L_{chamber}$ is about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 110 mm, about 115 mm, about 120 mm, about 125 mm, about 150 mm, about 200 mm, about 250 mm, or any value between these values.

The nozzle assembly 40 can have an effective diameter ED of each nozzle orifice 92 that is selected to facilitate passage of the optical fiber 24 between the reduced pressure environment $P_{reduced}$ of the treating zone 36 and the ambient pressure zone $P_{ambient}$ by sequentially changing a nozzle chamber pressure in each nozzle chamber 86 of the nozzle assembly 40. The effective diameter ED of each of the nozzle orifices 92 is based at least in part on a diameter of the optical fiber 24 passing through the nozzle assembly 40. In some aspects, the nozzle assembly 40 can have an effective diameter ED of each nozzle orifice 92 that is selected in concert with other features of the nozzle assembly 40, such as the number of nozzle chambers n, the nozzle height H, the nozzle length $L_{nozzle}$, and the nozzle chamber length $L_{chamber}$, to decrease and/or shift a location of a maximum Mach number of the air jet entraining the optical fiber 24 as it travels through the nozzle assembly 40. In some examples, the effective diameter ED of each nozzle orifice 92 in the nozzle assembly 40 is the same. In some examples, the effective diameter ED of one or more of the nozzle orifices 92 in the nozzle assembly 40 may be different than the other nozzle orifices 92. In some examples, the effective diameter ED of the nozzle orifices 92 can be greater than 0.1 mm, greater than 0.25 mm, greater than 0.5 mm, greater than 0.75 mm, greater than 1 mm, greater than 1.25 mm, greater than 1.5 mm, greater than 1.75 mm, greater than 2.0 mm, greater than 2.25 mm, greater than 2.5 mm, greater than 2.75 mm, greater than 3.0 mm, greater than 3.25 mm, greater than 3.5 mm, or greater than 4.0 mm. In some examples, the effective diameter ED is about 0.1 mm to about 4 mm, about 0.25 to about 4 mm, about 0.5 mm to about 4 mm, about 0.75 mm to about 4 mm, about 1 mm to about 4 mm, about 1.25 mm to about 4 mm, about 1.5 mm to about 4 mm, about 1.75 mm to about 4 mm, about 2 mm to about 4 mm, about 2.25 mm to about 4 mm, about 2.5 mm to about 4 mm, about 2.75 mm to about 4 mm, about 3 mm to about 4 mm, about 0.1 mm to about 3 mm, about 0.25 mm to about 3 mm, about 0.5 mm to about 3 mm, about 0.75 mm to about 3 mm, about 1 mm to about 3 mm, about 1.25 mm to about 3 mm, about 1.5 mm to about 3 mm, about 1.75 mm to about 3 mm, about 2 mm to about 3 mm, about 2.25 mm to about 3 mm, about 2.5 mm to about 3 mm, or about 2.75 mm to about 3 mm. In some examples, the effective diameter ED is about 0.1 mm, about 0.125 mm, about 0.145 mm, about 0.25 mm, about 0.5 mm, about 0.75 mm, about 1 mm, about 1.25 mm, about 1.5 mm, about 1.75 mm, about 2 mm, about 2.25 mm, about 2.5 mm, about 2.75 mm, about 3 mm, about 3.25 mm, about 3.5 mm, about 3.75 mm, about 4 mm, or any value between these values.

The nozzle assembly 40 can be configured such that a velocity of air entering the treating zone 36 as the optical fiber enters and/or exits the treatment device is less than 1.5 Mach. In some examples, the velocity of air entering the treating zone 36 is less than 1.4 Mach, less than 1.3 Mach, less than 1.2 Mach, less than 1.1 Mach, less than 1 Mach, less than 0.9 Mach, less than 0.8 Mach, less than 0.7 Mach, or less than 0.6 Mach. In some examples, the velocity of air entering the treating zone 36 is about 0.5 Mach to about 1.5 Mach, about 0.5 Mach to about 1.4 Mach, about 0.5 Mach to about 1.3 Mach, about 0.5 Mach to about 1.2 Mach, about 0.5 Mach to about 1.1 Mach, about 0.5 Mach to about 1 Mach, about 0.5 Mach to about 0.9 Mach, about 0.5 Mach to about 0.8 Mach, about 0.5 Mach to about 0.7 Mach, about 0.6 Mach to about 1.5 Mach, about 0.6 Mach to about 1.4 Mach, about 0.6 Mach to about 1.3 Mach, about 0.6 Mach to about 1.2 Mach, about 0.6 Mach to about 1.1 Mach, about 0.6 Mach to about 1 Mach, about 0.6 Mach to about 0.9 Mach, about 0.6 Mach to about 0.8 Mach, about 0.6 Mach to about 0.7 Mach, about 0.7 Mach to about 1.5 Mach, about 0.7 Mach to about 1.4 Mach, about 0.7 Mach to about 1.3 Mach, about 0.7 Mach to about 1.2 Mach, about 0.7 Mach to about 1.1 Mach, about 0.7 Mach to about 1 Mach, about 0.7 Mach to about 0.9 Mach, about 0.7 Mach to about 0.8 Mach, about 0.8 Mach to about 1.5 Mach, about 0.8 Mach to about 1.4 Mach, about 0.8 Mach to about 1.3 Mach, about 0.8 Mach to about 1.2 Mach, about 0.8 Mach to about 1.1 Mach, about 0.8 Mach to about 1 Mach, about 0.8 Mach to about 0.9 Mach, about 0.9 Mach to about 1.5 Mach, about 0.9 Mach to about 1.4 Mach, about 0.9 Mach to about 1.3 Mach, about 0.9 Mach to about 1.2 Mach, about 0.9 Mach to about 1.1 Mach, about 0.9 Mach to about 1 Mach, about 1 Mach to about 1.5 Mach, about 1 Mach to about 1.4 Mach, about 1 Mach to about 1.3 Mach, about 1 Mach to about 1.2 Mach, about 1 Mach to about 1.1 Mach, about 1.1 Mach to about 1.5 Mach, about 1.1 Mach to about 1.4 Mach, about 1.1 Mach to about 1.3 Mach, about 1.1 Mach to about 1.2 Mach, about 1.2 Mach to about 1.5 Mach, about 1.2 Mach to about 1.4 Mach, about 1.2 Mach to about 1.3 Mach, or about 1.3 Mach to about 1.5 Mach. In some examples, the velocity of air entering the treating zone 36 is about 0.5 Mach, about 0.6 Mach, about 0.7 Mach, about 0.8 Mach, about 0.9 Mach, about 1 Mach, about 1.1 Mach, about 1.2 Mach, about 1.3 Mach, about 1.4 Mach, about 1.5 Mach or any value between these values.

Still referring to FIGS. 2-6, each nozzle chamber 86 of the nozzle assembly 40 is configured to sequentially change a nozzle chamber pressure between the reduced pressure $P_{reduced}$ of the treating zone 36 and ambient pressure $P_{ambient}$. For example, with respect to the example nozzle assembly 40 of FIG. 2, each nozzle chamber 86a, 86b, 86c, 86d, and 86e is configured to have a respective nozzle chamber pressure $P_a$, $P_b$, $P_c$, $P_d$, and $P_e$ that sequentially increases from the reduced pressure $P_{reduced}$ of the treating zone 36 to ambient pressure $P_{ambient}$. According to an aspect of the present disclosure, the nozzle assembly 40 is configured such that the nozzle chamber pressure in each nozzle chamber 86 sequentially changes between the reduced pressure $P_{reduced}$ of the treating zone 36 and ambient pressure $P_{ambient}$ according to a pressure change ratio r defined by Formula (I):

$$r = 1 - \left(\frac{P_{reduced}}{P_{ambient}}\right)^{\frac{1}{n}} \qquad (I)$$

where n is the number of nozzle chambers 86 in the nozzle assembly 40 plus 1, $P_{reduced}$ is the reduced pressure in the treating zone 36, and $P_{ambient}$ is the ambient pressure. Thus, when the nozzle assembly 40 is used to facilitate passage of the optical fiber 24 from a reduced pressure environment to an ambient pressure environment, each nozzle chamber 86 can be configured to sequentially increase the corresponding nozzle chamber pressure by the pressure change ratio r. When the nozzle assembly 40 is used to facilitate passage of the optical fiber 24 from an ambient pressure environment to a reduced pressure environment, each nozzle chamber 86 can be configured to sequentially decrease the corresponding nozzle chamber pressure by the pressure change ratio r.

For example, with respect to the example nozzle assembly 40 illustrated in FIG. 3, the nozzle chamber pressure in each nozzle chamber 86 can be determined according to Formulas (IA) and (IB) based on the pressure change r determined using Formula (I) and one of the known system variables, such as ambient pressure $P_{ambient}$ or the reduced pressure $P_{reduced}$ in the treatment device 34 as follows:

$$r = \frac{P_j - P_i}{P_j} \quad \text{(IA)}$$

which can be written alternatively as Formula (IB):

$$\frac{P_i}{P_j} = 1 - r \quad \text{(IB)}$$

where $P_j$ refers to the pressure of nozzle chamber $86_j$ or the pressure $P_{ambient}$, $P_i$ refers to the pressure of nozzle chamber $86_i$ or the pressure $P_{reduced}$, $P_j > P_i$, and the nozzle chamber $86_j$ is adjacent to nozzle chamber $86_i$. For the particular embodiment shown in FIG. 3, Formula (IA) becomes Formula (IC):

$$r = \frac{P_{ambient} - P_d}{P_{ambient}} = \frac{P_d - P_c}{P_d} = \frac{P_c - P_b}{P_c} = \frac{P_b - P_a}{P_b} = \frac{P_a - P_{reduced}}{P_a} \quad \text{(IC)}$$

According to one aspect of the present disclosure, the nozzle assembly 40 can be fluidly coupled with a vacuum system 98 (shown in FIG. 2) to control the nozzle chamber pressure in each nozzle chamber 86 to satisfy the pressure change r defined by Formula (I). The vacuum system 98 can be configured to reduce the pressure in each individual nozzle chamber 86 to a reduced pressure less than ambient pressure. The vacuum system 98 can include one or more vacuum pumps, Venturi device, or other components configured to reduce the pressure within each nozzle chamber 86. The vacuum system 98 can be fluidly coupled with each nozzle chamber 86 to individually control the nozzle chamber pressure within a given nozzle chamber 86 using any suitable coupling. For example, each nozzle chamber 86 can include a vacuum port (not shown) which can be fluidly coupled with the vacuum system 98 to control the pressure within each nozzle chamber 86. The vacuum system 98 can be configured to individually control the pressure within each of the nozzle chambers 86 at incremental pressures between the reduced pressure $P_{reduced}$ of the treating zone 36 and the ambient pressure $P_{ambient}$. While the vacuum system 98 is only illustrated with respect to the example nozzle assembly 40 of FIG. 2, it is understood that the vacuum system 98 can be used with any of the nozzle assemblies disclosed herein, including the example nozzle assemblies 40 of FIGS. 3-6.

It is understood that there may be some variation between the nozzle chamber pressure calculated to satisfy the pressure change ratio r according to Formula (I) and the actual nozzle chamber pressure obtained in practice. For example, the calculated nozzle chamber pressure may vary by less than about 30%, less than about 20%, less than about 15%, less than about 10%, less than about 5%, less than about 2%, or less than about 1%. In addition, it is also understood that while the calculated nozzle chamber pressure may be expressed using any number of significant figures, the actual nozzle chamber pressure in practice may only be controlled up to a limited number of significant figures and still be considered as satisfying the pressure change ratio r.

In other embodiments, the nozzle 40 is configured such that the pressure in adjacent nozzle chambers 86 deviates from the pressure change ratio r of Formula (I). For example, if nozzle chambers $86_i$ and $86_j$ are adjacent nozzle chambers having nozzle chamber pressures $P_i$ and $P_j$, respectively with $P_j < P_i$, the ratio $P_j/P_i$ is in the range from 60% to 140% of the pressure change ratio r, or in the range from 65% of the pressure change ratio r to 135% of the pressure change ratio r, or in the range from 70% of the pressure change ratio r to 130% of the pressure change ratio r, or in the range from 80% of the pressure change ratio r to 120% of the pressure change ratio r, or in the range from 90% of the pressure change ratio r to 110% of the pressure change ratio r, or in the range from 95% of the pressure change ratio r to 105% of the pressure change ratio r, or in the range from 97% of the pressure change ratio r to 103% of the pressure change ratio r, where it is understood that the ratio $P_j/P_i$ is the same or different for different pairs of adjacent nozzle chambers.

According to one aspect of the present disclosure, the size of the orifices in the baffle plates defining the nozzle chambers 86 through which the optical fiber 24 passes as the optical fiber 24 travels between the reduced pressure environment $P_{reduced}$ and the ambient pressure environment $P_{ambient}$ can be configured to control the nozzle chamber pressure in each nozzle chamber 86 to satisfy the pressure change ratio r according to Formula (I) above and according to Formula (IIA), given by:

$$r = \frac{A_j - A_i}{A_j} \quad \text{(IIA)}$$

which can be written alternatively as Formula (IIB):

$$\frac{A_i}{A_j} = 1 - r \quad \text{(IIB)}$$

where $A_j$ refers to the area of the orifice in the baffle plate $88_j$ defining the nozzle chamber $86_j$, the area $A_{64}$ of the fiber outlet 64 from treatment device 36, or the area $A_{62}$ of the fiber inlet 62 to treatment device 36; $A_i$ refers to the area of the orifice in the baffle plate $88_i$ defining the nozzle chamber $86_i$ or the area $A_{94}$ of the nozzle outlet facing the ambient pressure environment; $A_j > A_i$; and nozzle chamber $86_j$ is adjacent to nozzle chamber $86_i$. In this manner, the nozzle chamber pressure in each nozzle chamber 86 can be controlled to satisfy the pressure change ratio r according to Formula (I) based on the dimensions of the orifices through which the optical fiber 24 travels through the nozzle assembly 40 entering and/or exiting a reduced pressure environment.

For example, with respect to the example nozzle assembly 40 of FIG. 3, each of the orifices into the nozzle chambers 86a-d—fiber outlet 64, nozzle orifice 92a, nozzle orifice 92b, nozzle orifice 92c, and nozzle outlet 94—can be determined using Formula (IIA) to control the pressure in each nozzle chamber 86a-d to satisfy the pressure change ratio r determined according to Formula (I). The pressure change ratio r can be determined according to Formula (I) to determine the desired pressure in each nozzle chamber 86. The value for the pressure change ratio r can then be used in Formula (IIA) to determine the area $A_j$ or $A_i$ of the orifices into each nozzle chamber 86 that will satisfy the pressure change ratio r according to Formula (I). The dimensions of each orifice into the nozzle chambers 86 can be selected to satisfy the area $A_j$ or $A_i$ for each nozzle chamber 86 determined according to Formula (IIA).

In some examples, the dimensions for each orifice into a nozzle chamber 86, such as the fiber inlet 62, the fiber outlet 64, the nozzle orifices 92, and/or the nozzle outlet 94, can be determined based on the area $A_j$ or $A_i$ that satisfies Formula (IIA) and in accordance with known mathematical formulas for determining the area of a geometric shape corresponding to the dimensions of each orifice. For example, for an orifice having a circular cross-sectional shape, the radius of a circle satisfying the calculated area $A_j$ or $A_i$ can be used to define the dimension of the orifice. For an orifice having a non-circular cross-sectional shape, the effective diameter ED corresponding to the area $A_j$ or $A_i$ determined using Formula (IIA) can be used to determine the dimensions orifice, as described above.

For example, with respect to the example nozzle assembly 40 illustrated in FIG. 4, the orifice into each of the nozzle chambers 86a-d, including fiber outlet 64 and nozzle orifices 92a-d, can be determined according to Formula (IIA) based on the pressure change ratio r determined according to Formula (I) using Formula (IIC) as follows:

$$r = \frac{A_{92c} - A_{92d}}{A_{92c}} = \frac{A_{92b} - A_{92c}}{A_{92b}} = \frac{A_{92a} - A_{92b}}{A_{92a}} = \frac{A_{64} - A_{92a}}{A_{64}} \quad \text{(IIC)}$$

wherein $A_{64}$, $A_{92}a$, $A_{92b}$, $A_{92c}$, and $A_{92d}$ correspond to the area of the fiber outlet 64 and nozzle orifices 92a, 92b, 92c, and 92d, respectively. The area $A_j$ or $A_i$ of one of the orifices, such as the fiber outlet 64 or one of the nozzle orifices 92a, 92b, 92c, or 92d, can be set based on an arbitrary value or set to satisfy a predetermined value and the area $A_j$ or $A_i$ of the remaining orifices can be determined using Formula (IIC) to control the pressure in each nozzle chamber 86a-d to satisfy the pressure change ratio r determined according to Formula (I). The determined area values $A_j$ or $A_i$ for each orifice can then be used to determine the dimensions of the orifice. For example, the dimensions of the final nozzle orifice 92d can be set to satisfy a minimum nozzle orifice tolerance for a predetermined optical fiber diameter and an area $A_j$ or $A_i$ for each of the remaining orifices, fiber outlet 64 and nozzle orifices 92a-c, can be determined using Formula (IIC) to satisfy the pressure change ratio r determined according to Formula (I).

In one example, limits on the dimensions of one of the orifices the optical fiber 24 travels through can be used in combination with Formulas (I) and (IIA) to determine the area $A_j$ or $A_i$ and corresponding effective diameter ED for each orifice into the nozzle chambers 86. For example, with reference to the example nozzle assembly 40 of FIG. 4, the area $A_j$ or $A_i$ of the last nozzle orifice 92d (i.e., the most downstream orifice) is the limiting nozzle orifice area, as each of the upstream nozzle orifices 92c, 92b, 92a and fiber outlet 64 will progressively increase as the nozzle chamber pressure progressively decreases from the last nozzle chamber 86d through the upstream nozzle chambers 86c, 86b, 86a and into the treating zone 36. In one example, the area $A_j$ or $A_i$ of the last nozzle orifice 92d may be selected based on providing a minimum required tolerance between the nozzle orifice 92d and the optical fiber 24 and Formulas (I) and (IIA) can be used to determine the area $A_j$ or $A_i$ of the remaining orifices, in this example nozzle orifices 92a, 92b, and 92c and fiber outlet 64, to satisfy the pressure change ratio r. It is understood that an area $A_j$ or $A_i$ of any one of the orifices through which the optical fiber 24 passes can be set arbitrarily or set to satisfy a predetermined value and the area $A_j$ or $A_i$ of the remaining orifices can be determined as described above according to Formula (IIA) to control the pressure in each nozzle chamber 86 to satisfy the pressure change ratio r determined according to Formula (I).

EXAMPLES

The following examples describe various features and advantages that can be provided by aspects of the present disclosure, and are in no way intended to limit the invention and appended claims.

The following example nozzle assemblies according to the present disclosure were evaluated through the use of Computational Fluid Dynamics models developed in ANSYS Fluent software, available from ANSYS, Inc. The models were based on one of the nozzle assembly configurations shown in FIGS. 2-6 and simulate an optical fiber traveling from a reduced pressure environment $P_{reduced}$ inside a treatment device to an ambient pressure environment $P_{ambient}$ through a nozzle assembly according to the present disclosure. The models assume that the medium through which the optical fiber travels is a compressible ideal gas and that ambient pressure ($P_{ambient}$) was 1 atm (101.3 kPa). The reduced pressure ($P_{reduced}$) inside the treating zone was assumed to be 0.2 atm (20.3 kPa). All of the models assumed a circular cross-sectional shape for the orifices into each nozzle chamber.

Example 1

Figure 7A:
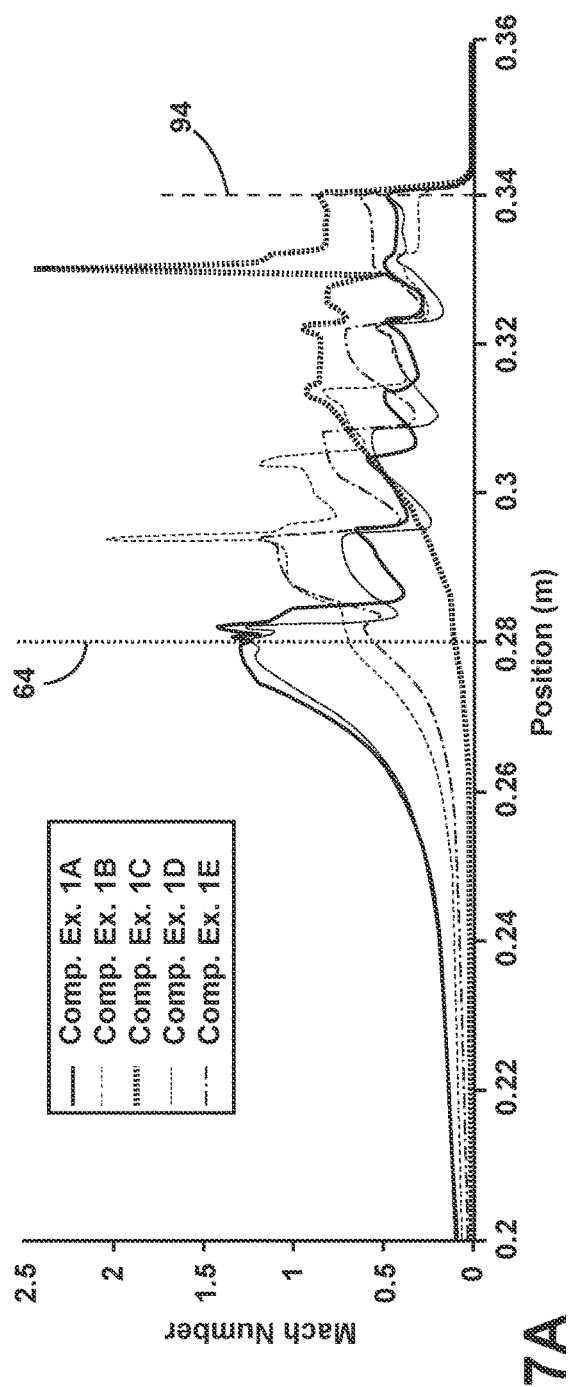
FIG. 7A is a plot of a simulation model of Mach number as a function of distance from a fiber outlet of a treatment device operating at a reduced pressure for an optical fiber passing through an exemplary nozzle assembly according to aspects of the present disclosure.
Figure 7B:
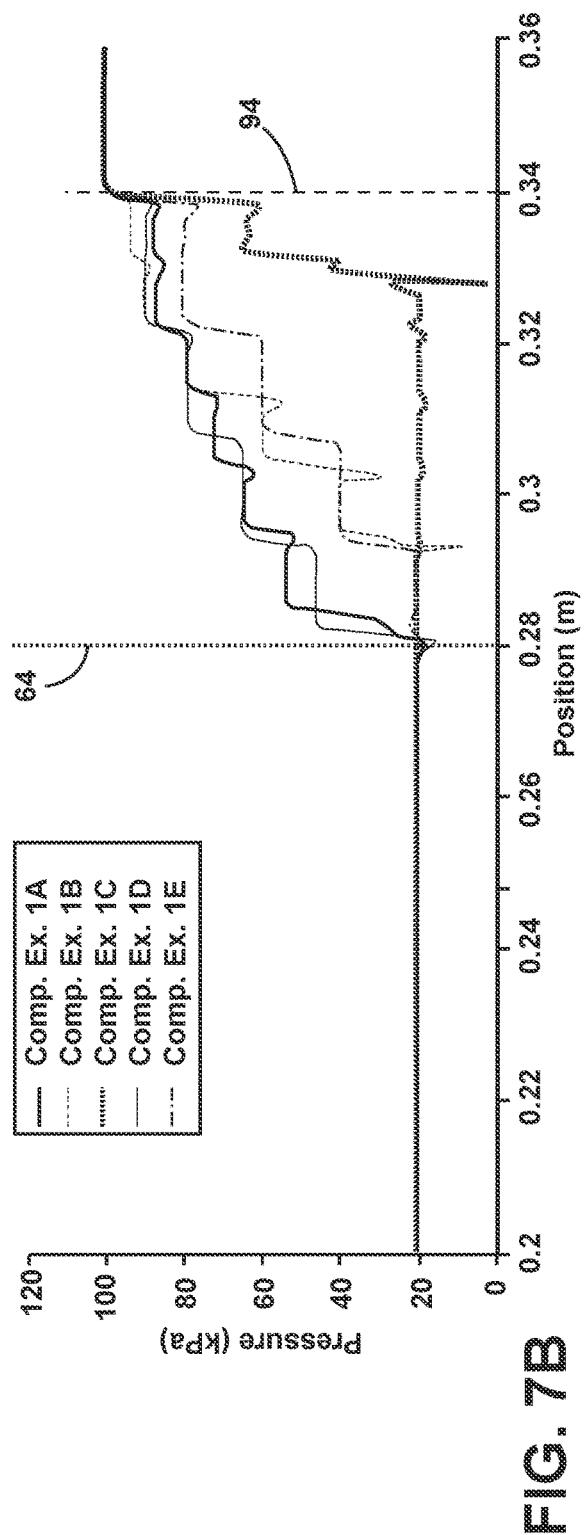
FIG. 7B is a plot of a simulation model of pressure as a function of distance from a fiber outlet of a treatment device operating at a reduced pressure for an optical fiber passing through an exemplary nozzle assembly according to aspects of the present disclosure under the same conditions as FIG. 7A.

FIGS. 7A and 7B illustrate the effect of the nozzle assemblies 40 of the present disclosure on the velocity of air flow into the treatment device 34 and a location of the maximum Mach number of the air jet. The dotted line 64 in each of FIGS. 7A and 7B indicates the location of the fiber outlet 64 of the treatment device 34. The "Position" indicated along the x-axis of FIGS. 7A-7B refers to a distance along the process pathway (e.g., Z-direction). Positions to the left of the line 64 correspond to positions within the treatment device 34, positions to the right of the line 64 and to the left of line 94 correspond to positions within the nozzle assembly 40, and positions to the right of the line 94 correspond to positions in the ambient environment, external to the nozzle assembly 40.

The simulation parameters for Comparative Example 1A ("Comp. Ex. 1A") are based on the example nozzle assembly 40 shown in FIG. 2. Comparative Example 1A includes a nozzle assembly 40 having 5 baffle plates 88, a nozzle length $L_{nozzle}$ of 60 mm, a nozzle height H of 7 mm, and an effective diameter ED of 1.5 mm for each nozzle orifice 92, the fiber outlet 64, and the nozzle outlet 94. In Comparative Example 1A, the pressure reduces gradually from the fiber outlet 64 to the last nozzle chamber 86e without active control of the pressure (such as from a vacuum system).

The simulation parameters for Comparative Example 1B ("Comp. Ex. 1B") are the same as that of Comparative Example 1A except that the nozzle chamber pressure in each nozzle chamber 86a-e is set at a predetermined value. This example simulates a configuration in which each nozzle chamber 86*a-e* is connected with the vacuum system 98 such that the pressure in each nozzle chamber 86*a-e* can be individually controlled. In Comparative Example 1B, the nozzle chamber pressures were set as follows: $P_a$=0.2 atm (20.3 kPa), $P_b$=0.4 atm (40.5 kPa), $P_c$=0.6 atm (60.8 kPa), $P_d$=0.8 atm (81.1 kPa), and $P_e$=0.9 atm (91.2 kPa).

The simulation parameters for Comparative Example 1C ("Comp. Ex. 1C") are the same as that of Comparative Example 1A except that the nozzle chamber pressure in each nozzle chamber 86*a-e* is set at the same value. In Comparative Example 1C, the nozzle chamber pressures $P_a$, $P_b$, $P_c$, $P_d$, and $P_e$ were set at 0.2 atm (20.3 kPa) and the pressure was allowed to increase after nozzle orifice 92*e*.

The simulation parameters for Comparative Example 1D ("Comp. Ex. 1D") are based on the example nozzle assembly 40 shown in FIG. 3. Comparative Example 1D includes a nozzle assembly 40 having 3 baffle plates 88, a nozzle length $L_{nozzle}$ of 60 mm, a nozzle height H of 7 mm, and an effective diameter ED of 1.5 mm for each nozzle orifice 92, the fiber outlet 64, and the nozzle outlet 94. In Comparative Example 1D, the pressure reduces gradually from the fiber outlet 64 to the last nozzle chamber 86*d* without active control of the pressure (such as from a vacuum system).

The simulation parameters for Comparative Example 1E ("Comp. Ex. 1E") are the same as that of Comparative Example 1D except that the nozzle chamber pressure in each nozzle chamber 86*a-d* is set at a predetermined value. This example simulates a configuration in which each nozzle chamber 86*a-d* is connected with the vacuum system 98 (shown in FIG. 2) such that the pressure in each nozzle chamber 86*a-d* can be individually controlled. In Comparative Example 1E, the nozzle chamber pressures were set as follows: $P_a$=0.2 atm (20.3 kPa), $P_b$=0.4 atm (40.5 kPa), $P_c$=0.6 atm (60.8 kPa), and $P_d$=0.8 atm (81.1 kPa).

Still referring to FIGS. 7A and 7B, the Comparative Examples 1A, 1D, and 1E show that the nozzle assemblies of the present disclosure having multiple nozzle chambers that gradually decrease the pressure between $P_{reduced}$ and $P_{ambient}$ result in a maximum flow Mach number at the fiber outlet of 1.47 or less. The maximum flow Mach number at the fiber outlet for a simulation with a straight tube having the same dimensions as the nozzle assembly (without the baffle plates) is 2.3. Thus, Comparative Examples 1A, 1D, and 1E demonstrate the ability of the nozzle assemblies of the present disclosure to significantly decrease the velocity of air entering the treatment device.

Comparative Example 1C includes a nozzle assembly having the baffle plate structure of the present disclosure, but is not configured to sequentially decrease the pressure in each of the nozzle chambers. Comparative Example 1C controls the nozzle chamber pressure at 0.2 atm (20.3 kPa) for each nozzle chamber and then allows the pressure to increase following the last nozzle orifice as the optical fiber travels toward the nozzle outlet and the ambient environment. Almost a third of the pressure increase occurs following the last nozzle orifice, with the remaining pressure increase occurring as the optical fiber exits the nozzle assembly through the nozzle outlet. The nozzle assembly of Comparative Example 1C shifts the maximum flow Mach number away from the fiber outlet, but the maximum flow Mach number is still high at about 2.4. Comparative Example 1C illustrates the ability of the baffle plates to shift the location of the maximum flow Mach number away from the fiber outlet.

Comparative Examples 1A and 1D, in which the pressure in each nozzle chamber gradually decreases without any active control over the nozzle chamber pressure, exhibit a maximum flow Mach number less than 1.5, however, the maximum flow Mach number still occurs at the fiber outlet. In comparison, Comparative Example 1B and 1E, in which the pressure in each nozzle chamber is actively controlled, exhibit a maximum flow Mach number that is shifted away from the fiber outlet.

Comparative Example 1E includes fewer baffle plates than Comparative Example 1B over the same nozzle length $L_{nozzle}$ and thus the nozzle chamber length $L_{chamber}$ in Comparative Example 1E is greater than the nozzle chamber length $L_{chamber}$ of Comparative Example 1B. Comparative Example 1E exhibits a low maximum flow Mach number of 1.19 that is also shifted away from the fiber outlet. In the simulation of Comparative Example 1E only 30% of the air jet passes into the treatment device through the fiber outlet, at a speed of 0.0778 g/s. Comparative Examples 1D and 1E also demonstrate that reducing the number of baffle plates, thereby reducing the nozzle chamber length $L_{chamber}$, can decrease the interaction between nozzle chambers, which can increase viscous energy dissipation.

Comparative Examples 1A-E demonstrate the ability of the nozzle assemblies of the present disclosure to decrease a maximum flow Mach number and/or to shift the maximum flow Mach number away from the fiber outlet. Decreasing and/or shifting the maximum flow Mach number may facilitate decreasing an amount and/or velocity of the air jet entering the treatment device as the optical fiber passes through the treatment device. Decreasing and/or shifting the maximum flow Mach number may also decrease the risk of the optical fiber vibrating and contacting components of the treatment device as the optical fiber passes through the treatment device.

Example 2

Figure 8:
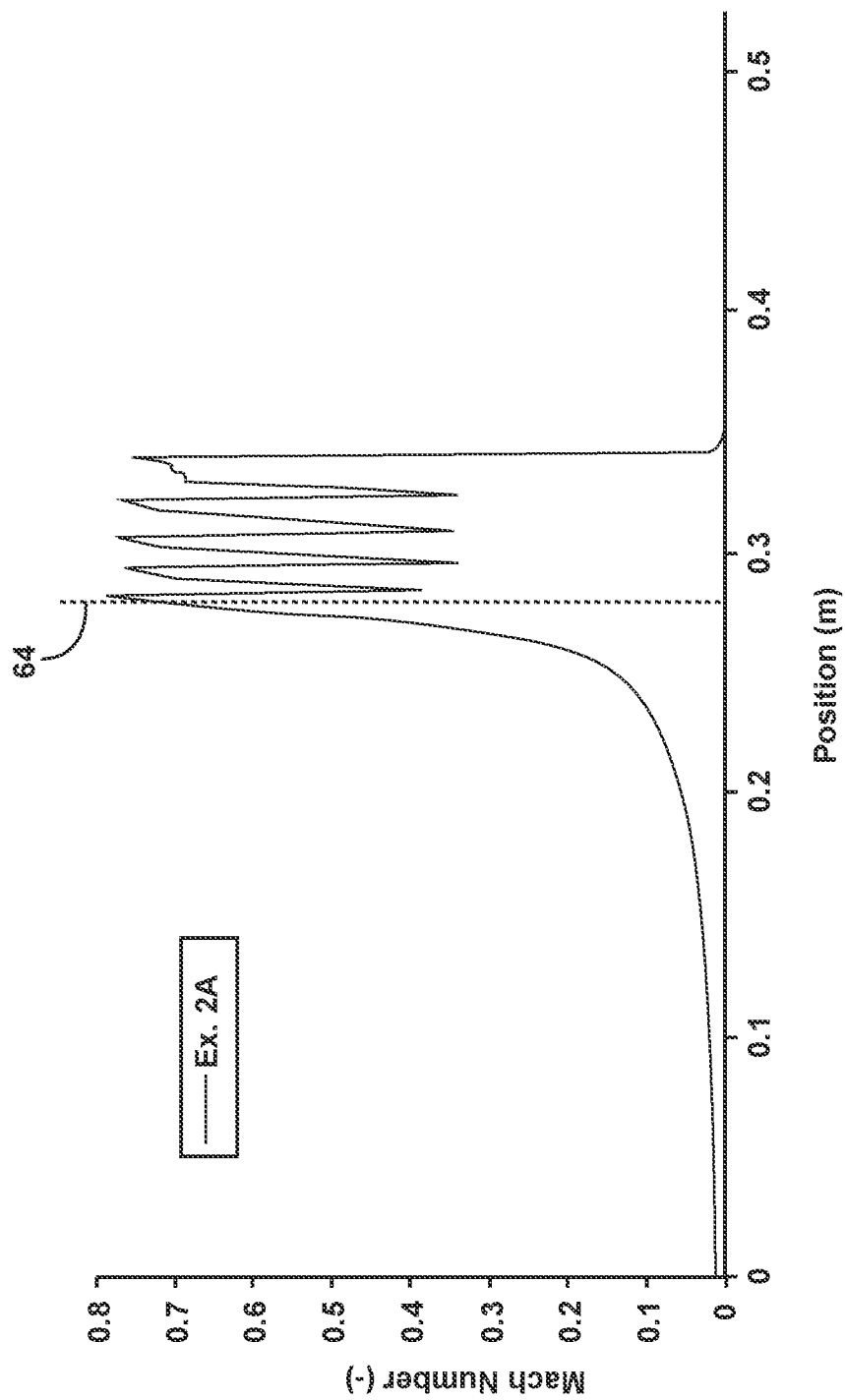
FIG. 8 is a plot of a simulation model of Mach number as a function of distance from a fiber outlet of a treatment device operating at a reduced pressure for an optical fiber passing through an exemplary nozzle assembly under operating conditions according to aspects of the present disclosure.

FIG. 8 illustrates the effect of controlling the change in pressure between adjacent nozzle chambers according to the pressure change ratio r of Formula (I) on the location and magnitude of the maximum flow Mach number in the nozzle assembly.

The simulation parameters for Example 2A ("Ex. 2A") are the same as that of Comparative Example 1D, which is based on the example nozzle assembly shown in FIG. 3, except that the nozzle chamber pressure in each nozzle chamber 86*a-d* is set based on a pressure change ratio r determined according to Formula (I). This example simulates a configuration in which each nozzle chamber 86*a-d* is connected with the vacuum system 98 (shown in FIG. 2) such that the pressure in each nozzle chamber 86*a-d* can be individually controlled. The pressure change ratio r for Example 2A was determined according to Formula (I) as follows:

$$r = 1 - (P_n/P_0)^{(1/n)} = 1 - (0.2 \text{ atm}/1 \text{ atm})^{(1/5)} = 0.275$$

The pressure change ratio r was used to determine the pressure for each nozzle chamber 86*a-d* as follows according to Formula (III) using the known ambient pressure $P_{ambient}$ and the calculated pressure change ratio r:

$$r = \frac{P_{ambient} - P_d}{P_{ambient}} = \frac{P_d - P_c}{P_d} = \frac{P_c - P_b}{P_c} = \frac{P_b - P_a}{P_b} \quad \text{(III)}$$

Based on the calculated pressure change ratio r and an ambient pressure $P_{ambient}$ of 1 atm (101.3 kPa), the nozzle chamber pressures for Example 2A were set as follows: $P_a$=0.276 atm (20.3 kPa), $P_b$=0.38 atm (40.5 kPa), $P_c$=0.5256 atm (60.8 kPa), and $P_d$=0.725 atm (81.1 kPa). FIG. 8 shows that the nozzle assembly of Example 2A has maximum flow Mach number of less than 0.8. The maximum flow Mach number of Example 2A is even lower than the maximum flow Mach number of Examples 1D and 1E in which the change in pressure between adjacent nozzle chambers was set at a predetermined value, but was not controlled according to the pressure change ratio r. Without being limited by any theory, it is believed that changing the pressure between adjacent nozzle chambers according to the pressure change ratio r improves viscous energy dissipation in the nozzle chambers, which may account for the decrease in the maximum flow Mach number exhibited by Example 2A compared to Examples 1D and 1E.

Example 3

Figure 9:
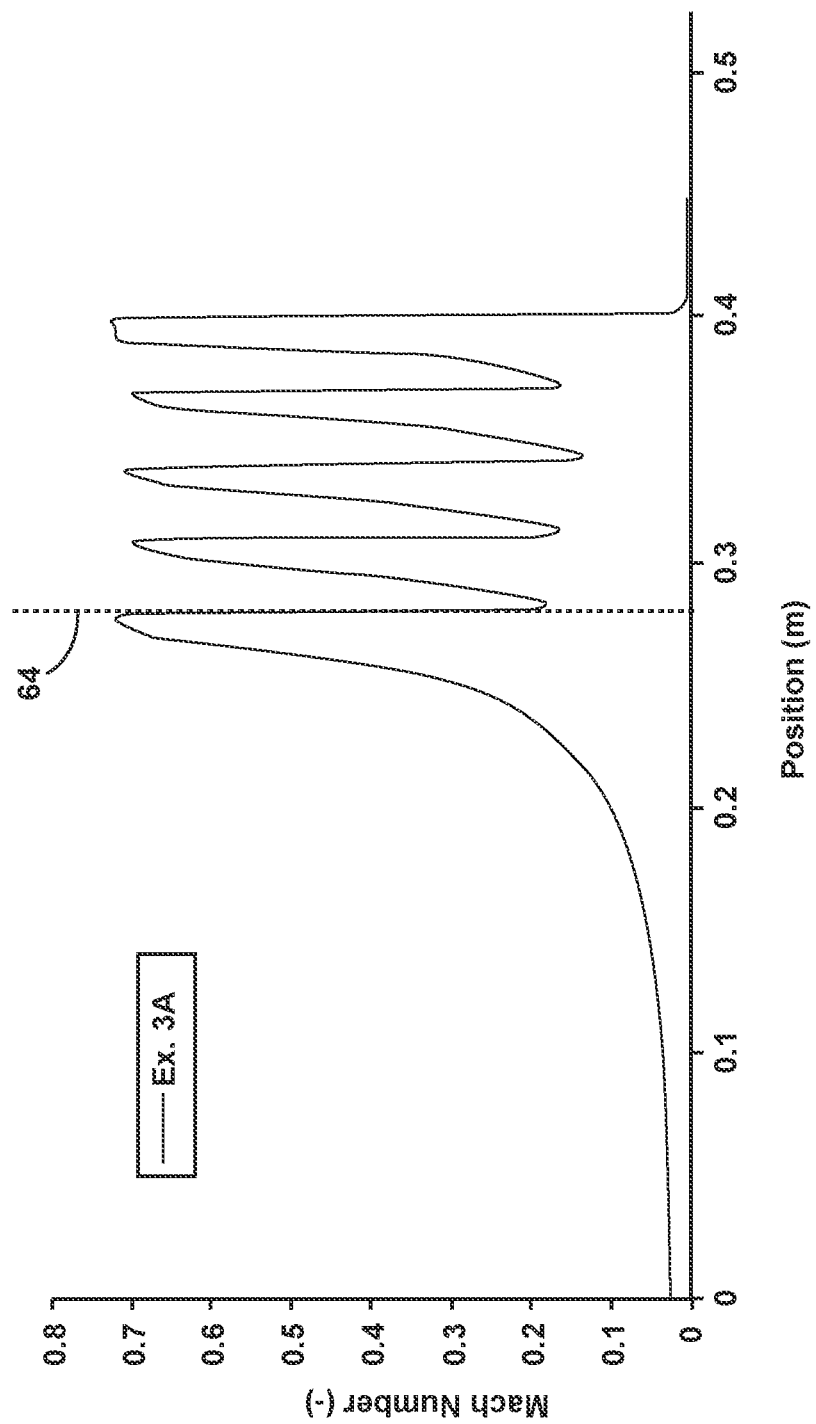
FIG. 9 is a plot of a simulation model of Mach number as a function of distance from a fiber outlet of a treatment device operating at a reduced pressure for an optical fiber passing through an exemplary nozzle assembly under operating conditions according to aspects of the present disclosure.

FIG. 9 illustrates the effect of controlling the change in pressure between adjacent nozzle chambers according to the pressure change ratio r of Formula (I) and based on the area $A_j$ or $A_i$ of the orifices into and out of the nozzle chambers 86 according to Formula (IIA) on the magnitude of the maximum flow Mach number in the nozzle assembly 40.

The simulation parameters for Example 3A ("Ex. 3A") are based on the nozzle assembly 40 of FIG. 4. Example 3A includes 4 nozzle chambers 86a-d, a nozzle length $L_{nozzle}$ of 120 mm, and a nozzle height H of 15 mm. The pressure change ratio r was determined for Example 3A using Formula (I) as follows:

$$r = 1-(P_n/P_0)^{(1/n)} = 1-(0.2\ \text{atm}/1\ \text{atm})^{(1/5)} = 0.275$$

The pressure change ratio r was used to determine the pressure for each nozzle chamber 86a-d according to Formula (IV) as follows:

$$r = \frac{P_{ambient} - P_d}{P_{ambient}} = \frac{P_d - P_c}{P_d} = \frac{P_c - P_b}{P_c} = \frac{P_b - P_a}{P_b} \quad \text{(IV)}$$

Based on the calculated pressure change ratio r and an ambient pressure $P_{ambient}$ of 1 atm (101.3 kPa), the nozzle chamber pressures for Example 3A were determined as follows: $P_a$=0.276 atm (20.3 kPa), $P_b$=0.38 atm (40.5 kPa), $P_c$=0.5256 atm (60.8 kPa), and $P_d$=0.725 atm (81.1 kPa). The pressure in each nozzle chamber 86a-d was controlled to satisfy the pressure change ratio r by selecting the area $A_j$ or $A_i$ for each orifice into each nozzle chamber 86 according to Formula (IIC) as follows:

$$r = \frac{A_{92c} - A_{92d}}{A_{92c}} = \frac{A_{92b} - A_{92c}}{A_{92b}} = \frac{A_{92a} - A_{92b}}{A_{92a}} = \frac{A_{64} - A_{92a}}{A_{64}} \quad \text{(IIC)}$$

wherein $A_{64}$, $A_{92}a$, $A_{92b}$, $A_{92c}$, and $A_{92d}$ correspond to the area of the fiber outlet 64 and nozzle orifices 92a, 92b, 92c, and 92d, respectively. The value for each of the areas $A_{64}$, $A_{92a}$, $A_{92b}$, $A_{92c}$, and $A_{92d}$ was determined by solving the equation above and assuming that each orifice into each nozzle chamber 86 had a circular cross-sectional shape and assuming that the last nozzle orifice 92d had a diameter of 1.5 mm. Based on these assumptions, the diameter for each of the remaining orifices into the nozzle chambers 86a-d for Example 3A were determined as follows: 1.76 mm (nozzle orifice 92c), 2.07 mm (nozzle orifice 92b), 2.43 (nozzle orifice 92a), and 2.86 mm (fiber outlet 64).

As illustrated in FIG. 9, controlling the nozzle chamber pressure to satisfy the pressure change ratio r based on the dimensions of the orifices into the nozzle chambers 86 according to Formulas (IV) and (IIC) resulted in a maximum flow Mach number of less than 0.8. In addition, Example 3A, which includes an increased nozzle length $L_{nozzle}$ compared to Example 2A, shows an improvement in a degree of flow interaction between adjacent nozzle chambers compared to Example 2A. The extent to which the Mach number drops between successive peaks in FIGS. 8 and 9 is related to the degree of interaction between the flow in adjacent nozzle chambers, which may be indicative of energy dissipation in each nozzle chamber. FIG. 9 shows a lower minimum Mach number for Example 3A compared to the minimum Mach number shown in FIG. 8 for Example 2A, indicative of increased energy dissipation for Example 3A compared to Example 2A.

Example 4

Figure 10:
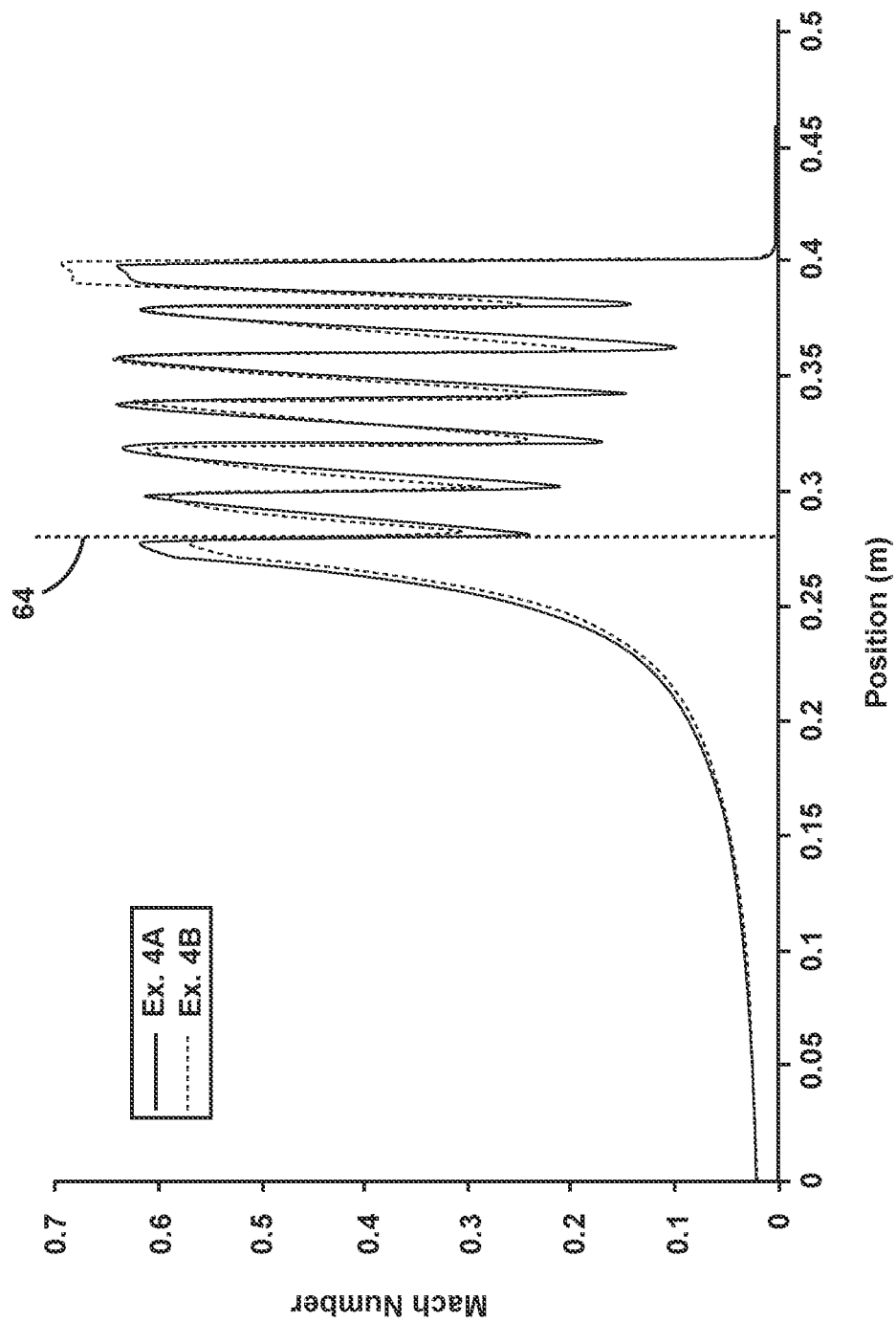
FIG. 10 is a plot of a simulation model of Mach number as a function of distance from a fiber outlet of a treatment device operating at a reduced pressure for an optical fiber passing through an exemplary nozzle assembly under operating conditions according to aspects of the present disclosure.

FIG. 10 illustrates the effect of controlling the change in pressure between adjacent nozzle chambers according to the pressure change ratio r of Formula (I) and the area $A_j$ or $A_i$ of the orifices into the nozzle chambers 86 according to Formula (II) on the magnitude of the maximum flow Mach number in the nozzle assembly 40.

The simulation parameters for Examples 4A and 4B ("Ex. 4A" and "Ex. 4B") are based on the nozzle assembly 40 of FIGS. 5 and 6, respectively. Examples 4A and 4B include 6 nozzle chambers 86a-f and a nozzle length $L_{nozzle}$ of 120 mm. The nozzle height H of Example 4A was 7.5 mm and the nozzle height H Example 4B was 15 mm. The pressure change ratio r was determined for Examples 4A and 4B using Formula (I) as follows:

$$r = 1-(P_n/P_0)^{(1/n)} = 1-(0.2\ \text{atm}/1\ \text{atm})^{(1/7)} = 0.205$$

The pressure change ratio r was used to determine the pressure for each nozzle chamber 86a-f according to Formula (V) as follows:

$$r = \frac{P_{ambient} - P_f}{P_{ambient}} = \quad \text{(V)}$$
$$\frac{P_f - P_e}{P_f} = \frac{P_e - P_d}{P_e} = \frac{P_d - P_c}{P_d} = \frac{P_c - P_b}{P_c} = \frac{P_b - P_a}{P_b}$$

Based on the calculated pressure change ratio r and an ambient pressure $P_{ambient}$ of 1 atm (101.3 kPa), the nozzle chamber pressures for Examples 4A and 4B were determined as follows: $P_a$=0.25 atm (25.3 kPa), $P_b$=0.32 atm (32.4 kPa), $P_c$=0.40 atm (40.5 kPa), $P_d$=0.50 atm (50.7 kPa), $P_e$=0.63 atm (63.8 kPa), $P_f$=0.795 atm (80.6 kPa). The pressure in each nozzle chamber 86a-f was controlled to satisfy the pressure change ratio r by selecting the area $A_j$ or $A_i$ for each orifice into each nozzle chamber 86a-f according to Formula (VI) as follows:

$$r = \frac{A_{92e} - A_{92f}}{A_{92e}} = \frac{A_{92d} - A_{92f}}{A_{92d}} = \quad \text{(VI)}$$
$$\frac{A_{92c} - A_{92d}}{A_{92c}} = \frac{A_{92b} - A_{92c}}{A_{92b}} = \frac{A_{92a} - A_{92b}}{A_{92a}} = \frac{A_{64} - A_{92a}}{A_{64}}$$

wherein $A_{64}$, $A_{92}a$, $A_{92b}$, $A_{92c}$, $A_{92d}$, $A_{92e}$, and $A_{92f}$ correspond to the area of the fiber outlet 64 and nozzle orifices 92a, 92b, 92c, 92d, 92e, and 92f respectively. The value for each of the areas $A_{64}$, $A_{92}a$, $A_{92b}$, $A_{92c}$, $A_{92d}$, $A_{92e}$, and $A_{92f}$ was determined by solving the equation above and assuming that each orifice into each nozzle chamber 86 had a circular cross-sectional shape and assuming that the last nozzle orifice 92e had a diameter of 1.5 mm. Based on these assumptions, the diameter for each of the remaining orifices into the nozzle chambers 86a-f for Examples 4A and 4B was determined as follows: 1.65 mm (nozzle orifice 92e), 1.87 mm (nozzle orifice 92d), 2.06 mm (nozzle orifice 92c), 2.32 mm (nozzle orifice 92b), 2.64 (nozzle orifice 92a), and 3.0 mm (fiber outlet 64).

Examples 4A and 4B both exhibits a maximum flow Mach number below 7. Examples 4A-B, when compared to Example 3A, demonstrate that an increase in the number of nozzle chambers can result in a decrease in the maximum flow Mach number. In addition, the extent to which the Mach number drops between successive peaks for Example 4A compared to Example 4B suggests that the narrower nozzle height of Example 4A corresponds to an increase in energy dissipation between nozzle chambers compared to Example 4B.

The following non-limiting aspects are encompassed by the present disclosure:

According to a first aspect of the present disclosure, a system for processing an optical fiber includes: a furnace configured to produce an optical fiber from a fiber preform; a treatment device downstream of the furnace including a treating zone, the treating zone including a fiber inlet and fiber outlet, wherein the treating zone is configured to cool the optical fiber at a reduced pressure below ambient pressure and at a slow cooling rate less than an ambient cooling rate; and a nozzle assembly disposed at one or more of the fiber inlet, the fiber outlet, upstream of the treating zone, and downstream of the treating zone, wherein the nozzle assembly includes multiple baffle plates defining a number of nozzle chambers, each of the nozzle chambers having a nozzle chamber pressure, wherein each baffle plate includes an orifice having a predetermined effective orifice diameter through which the optical fiber passes, wherein the number of nozzle chambers include a first nozzle chamber having a nozzle chamber pressure $P_a$ and a second nozzle chamber having a nozzle chamber pressure $P_b$, wherein $P_b < P_a$ and the second nozzle chamber is adjacent to the first nozzle chamber, and wherein a ratio $P_b/P_a$ is in a range from 60% to 140% of a pressure change ratio r defined by Formula (I):

$$r = 1 - \left(\frac{P_{reduced}}{P_{ambient}}\right)^{\frac{1}{n}}. \quad (I)$$

wherein n is one more than the number of nozzle chambers in the nozzle assembly.

According to the first aspect of the present disclosure, in a second aspect, the nozzle assembly is disposed upstream of the treating device, and wherein the nozzle chamber pressures of the nozzle chambers are configured to sequentially decrease in the downstream direction.

According to the first aspect of the present disclosure, in a third aspect, the nozzle assembly is disposed downstream of the treating device, and wherein the nozzle chamber pressures of the nozzle chambers are configured to sequentially increase in the downstream direction.

According to any one of the first to the third aspects, in a fourth aspect, the nozzle assembly is coupled to a vacuum system configured to control the nozzle chamber pressures $P_a$ and $P_b$.

According to any one of the first to the fourth aspects, in a fifth aspect, the orifice into the first nozzle chamber has an area $A_a$ and the orifice into the second nozzle chamber has an area $A_b$, wherein $A_b > A_a$, and wherein the ratio of $A_a/A_b$ is defined by Formula (II):

$$\frac{A_a}{A_b} = 1 - r. \quad (II)$$

According to any one of the first to the fifth aspects, in a sixth aspect, each of the multiple baffle plates includes a cross-sectional shape corresponding to a frustum of a cone or a pyramid.

According to any one of the first to the sixth aspects, in a seventh aspect, the predetermined effective orifice diameter is from about 0.145 mm to about 3 mm.

According to any one of the first to the seventh aspects, in an eighth aspect, the orifice has a cross-sectional shape that is one of circular, oval, and polygonal.

According to any one of the first to the eighth aspects, in a ninth aspect, the nozzle assembly further includes an enclosure and the baffle plates are disposed within the enclosure.

According to any one of the first aspects and the third to the ninth aspects, in a tenth aspect, the nozzle assembly is disposed at one of: upstream of the treating zone at an inlet of a first positioner disposed upstream of the treating zone; and downstream of the treating zone at an outlet of a second positioner disposed downstream of the treating zone.

According to any one of the first aspects and the third to the ninth aspects, in an eleventh aspect, the nozzle assembly is disposed at the fiber outlet and wherein the nozzle assembly is configured to decrease an air velocity of ambient air entering the treating zone at the fiber outlet to less than 1.5 Mach.

According to any one of the first to the eleventh aspects, in a twelfth aspect, further including: a re-heating device disposed upstream of the treating zone.

According to any one of the first to the twelfth aspects, in a thirteenth aspect, the reduced pressure is about 0.1 kPa to about 81.1 kPa.

According to any one of the first to the thirteenth aspects, in a fourteenth aspect, the nozzle assembly includes three nozzle chambers (n=3), five nozzle chambers (n=5), or seven nozzle chambers (n=7).

According to any one of the first to the fourteenth aspects, in a fifteenth aspect, the number of nozzle chambers is at least three (n=3).

According to the fifteenth aspect, in a sixteenth aspect, the nozzle chamber pressures of each adjacent pair of the nozzle chambers are in a range from 60% to 140% of the pressure change ratio r.

According to any one of the first to the fifteenth aspects, in a seventeenth aspect, the ratio $P_b/P_a$ is in a range from 80% to 120% of the pressure change ratio r.

According to any one of the first to the fifteenth aspects, in an eighteenth aspect, the ratio $P_b/P_a$ is in a range from 90% to 110% of the pressure change ratio r.

According to any one of the first to the fifteenth aspects, in a nineteenth aspect, the ratio $P_b/P_a$ is in a range from 95% to 105% of the pressure change ratio r.

According to any one of the first to the nineteenth aspects, in a twentieth aspect, further including a third nozzle chamber having a nozzle chamber pressure $P_c < P_b$, the third nozzle chamber adjacent to the second nozzle chamber, and wherein the ratio $P_c/P_b$ is in a range from 60% to 140% of the pressure change ratio r.

According to the twentieth aspect, in a twenty-first aspect, further including a fourth nozzle chamber having a nozzle chamber pressure $P_d<P_c$, the fourth nozzle chamber adjacent to the third nozzle chamber, and wherein the ratio $P_d/P_c$ is in a range from 60% to 140% of the pressure change ratio r.

According to a twenty-second aspect of the present disclosure, a method for processing an optical fiber includes: drawing the optical fiber from a heated glass source; passing the optical fiber through a treatment device including a treating zone including a fiber inlet and a fiber outlet; cooling the optical fiber in the treating zone at a reduced pressure below ambient pressure and at a slow cooling rate less than an ambient cooling rate; passing the optical fiber through a nozzle assembly disposed at one or more of the fiber inlet, the fiber outlet, upstream of the treating zone, and downstream of the treating zone, the nozzle assembly including multiple baffle plates defining a number of nozzle chambers, each of the nozzle chambers having a nozzle chamber pressure, wherein each baffle plate includes an orifice having a predetermined effective orifice diameter through which the optical fiber passes; and sequentially changing a nozzle chamber pressure in each nozzle chamber, wherein the multiple nozzle chambers include a first nozzle chamber having a nozzle chamber pressure $P_a$ and a second nozzle chamber having a nozzle chamber pressure $P_b$, wherein $P_b<P_a$ and the second nozzle chamber is adjacent to the first nozzle chamber, and wherein a ratio $P_b/P_a$ is in a range from 60% to 140% of a pressure change ratio r defined by Formula (I):

$$r = 1 - \left(\frac{P_{reduced}}{P_{ambient}}\right)^{\frac{1}{n}} \quad (I)$$

wherein n is one more than the number of nozzle chambers in the nozzle assembly.

According to the twenty-second aspect, in a twenty-third aspect, the nozzle assembly is disposed upstream of the treating device, and wherein the nozzle chamber pressures of the nozzle chambers are configured to sequentially decrease in the downstream direction.

According to the twenty-second aspect, in a twenty-fourth aspect, the nozzle assembly is disposed downstream of the treating device, and wherein the nozzle chamber pressures of the nozzle chambers are configured to sequentially increase in the downstream direction.

According to any one of the twenty-second to the twenty-fourth aspects, in a twenty-fifth aspect, the sequentially changing a nozzle pressure in each nozzle chamber includes operating a vacuum system coupled with the nozzle assembly to control the nozzle chamber pressures $P_a$ and $P_b$.

According to any one of the twenty-second to the twenty-fourth aspects, in a twenty-sixth aspect, the orifice into the first nozzle chamber has an area $A_a$ and the orifice into the second nozzle chamber has an area $A_b$, wherein $A_b>A_a$, and wherein the ratio of $A_a/A_b$ is defined by Formula (II):

$$\frac{A_a}{A_b} = 1 - r. \quad (II)$$

According to any one of the twenty-second to the twenty-sixth aspects, in a twenty-seventh aspect, the predetermined effective orifice diameter is from about 0.145 mm to about 3 mm.

According to any one of the twenty-second to the twenty-seventh aspects, in a twenty-eighth aspect, the nozzle assembly further includes an enclosure and the baffle plates are disposed within the enclosure.

According to any one of the twenty-second to the twenty-eighth aspects, in a twenty-ninth aspect, each of the multiple baffle plates includes a cross-sectional shape corresponding to a frustum of a cone or a pyramid.

According to any one of the twenty-second to the twenty-ninth aspects, in a thirtieth aspect, the orifice has a cross-sectional shape that is one of circular, oval, and polygonal.

According to any one of the twenty-second to the thirtieth aspects, in a thirty-first aspect, the nozzle assembly is disposed at the fiber outlet and wherein the nozzle assembly is configured to decrease an air velocity of ambient air entering the treating zone at the fiber outlet to less than 1.5 Mach.

According to any one of the twenty-second to the thirty-first aspects, in a thirty-second aspect, the step of passing the optical fiber through a nozzle assembly further includes at least one of: passing the optical fiber through a nozzle assembly disposed upstream of the treating zone at an inlet of a first positioner disposed upstream of the treating zone; and passing the optical fiber through a nozzle assembly disposed downstream of the treating zone at an outlet of a second positioner disposed downstream of the treating zone.

According to any one of the twenty-second to the thirty-second aspects, in a thirty-third aspect, further including: passing the optical fiber through a re-heating device disposed upstream of the treating zone.

According to any one of the twenty-second to the thirty-third aspects, in a thirty-fourth aspect, the nozzle assembly includes three nozzle chambers (n=3), five nozzle chambers (n=5), or seven nozzle chambers (n=7).

According to any one of the twenty-second to the thirty-fourth aspects, in a thirty-fifth aspect, the reduced pressure includes a pressure of about 0.1 kPa to about 81.1 kPa.

According to any one of the twenty-second to the thirty-fifth aspects, in a thirty-sixth aspect, the number of nozzle chambers is at least three (n=3).

According to the thirty-sixth aspect, in a third-seventh aspect, the nozzle chamber pressures of each adjacent pair of the nozzle chambers are in a range from 60% to 140% of the pressure change ratio r.

According to any one of the twenty-second to the thirty-sixth aspects, in a thirty-eighth aspect, the ratio $P_b/P_a$ is in a range from 80% to 120% of the pressure change ratio r.

According to any one of the twenty-second to the thirty-sixth aspects, in a thirty-ninth aspect, the ratio $P_b/P_a$ is in a range from 90% to 110% of the pressure change ratio r.

According to any one of the twenty-second to the thirty-sixth aspects, in a fortieth aspect, the ratio $P_b/P_a$ is in a range from 95% to 105% of the pressure change ratio r.

According to any one of the twenty-second to the fortieth aspects, in a forty-first aspect, further including a third nozzle chamber having a nozzle chamber pressure $P_c<P_b$, the third nozzle chamber adjacent to the second nozzle chamber, and wherein the ratio $P_c/P_b$ is in a range from 60% to 140% of the pressure change ratio r.

According to the forty-first aspect, in a forty-second aspect, further including a fourth nozzle chamber having a nozzle chamber pressure $P_d<P_c$, the fourth nozzle chamber adjacent to the third nozzle chamber, and wherein the ratio $P_d/P_c$ is in a range from 60% to 140% of the pressure change ratio r.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A system for processing an optical fiber, the system comprising:
   a furnace configured to produce an optical fiber from a fiber preform;
   a treatment device downstream of the furnace comprising a treating zone, the treating zone comprising a fiber inlet and fiber outlet, wherein the treating zone is configured to cool the optical fiber at a predetermined reduced pressure ($P_{reduced}$) below ambient pressure ($P_{ambient}$) and at a slow cooling rate less than an ambient cooling rate; and
   a nozzle assembly disposed at one or more of the fiber inlet, the fiber outlet, upstream of the treating zone, and downstream of the treating zone, wherein the nozzle assembly comprises multiple baffle plates defining a number of nozzle chambers including a first nozzle chamber and a second nozzle chamber adjacent to the first nozzle chamber, each baffle plate comprising an orifice in communication with the nozzle chamber that the baffle plate defines, each orifice comprises an effective orifice diameter;
   wherein, the effective orifice diameters of the nozzle chambers asre each predetermined to incrementally change the pressure to which the optical fiber is subjected while transitioning between the predetermined reduced pressure whithin the treatment device and ambient pressure, each nozzle chamber having a different predetermined nozzle chamber pressure;
   wherein, the effective orifice diameters of the orifice of the rifst nozzle chamber and the second nozzle chamber are each further predetermined so that the predetermined nozzle chamber pressures ($P_a$, $P_b$) of the first nozzle chamber and the second nozzle chamber differ by a ratio $P_b/P_a$ that is within a range of from 60% to 140% of a pressure change ratio r defined by Formula (I):

$$r = 1 - \left(\frac{P_{reduced}}{P_{ambient}}\right)^{\frac{1}{n}} \quad (I)$$

wherein n is one more than the number of nozzle chambers in the nozzle assembly.

2. The system of claim 1, wherein the nozzle assembly is disposed upstream of the treatment device, and wherein the predetermined nozzle chamber pressures of the nozzle chambers are configured to sequentially decrease in the downstream direction.

3. The system of claim 1, wherein the nozzle assembly is disposed downstream of the treatment device, and wherein the predetermined nozzle chamber pressures of the nozzle chambers are configured to sequentially increase in the downstream direction.

4. The system of claim 1, wherein the nozzle assembly is coupled to a vacuum system configured to control the predetermined nozzle chamber pressures $P_a$ and $P_b$.

5. The system of claim 1, wherein the orifice into the first nozzle chamber has a predetermined area $A_a$ and the orifice into the second nozzle chamber has a predetermined area $A_b$, wherein $A_b > A_a$, and wherein the ratio of $A_a/A_b$ is defined by Formula (II):

$$\frac{A_a}{A_b} = 1 - r. \quad (II)$$

6. The system of claim 1, wherein at least one of:
   each of the multiple baffle plates comprises a cross-sectional shape corresponding to a frustum of a cone or a pyramid;
   the orifice of each baffle plate has a cross-sectional shape that is one of circular, oval, and polygonal; and
   the nozzle assembly comprises three nozzle chambers (n=3), five nozzle chambers (n=5), or seven nozzle chambers (n=7).

7. The system of claim 1, wherein the number of nozzle chambers is at least three (n=3), and wherein a ratio of the predetermined nozzle chamber pressures of each adjacent pair of the nozzle chambers are in a range from 60% to 140% of the pressure change ratio r.

8. The system of claim 1, wherein the nozzle assembly is disposed at one of:
   upstream of the treating zone at an inlet of a first positioner disposed upstream of the treating zone; and
   downstream of the treating zone at an outlet of a second positioner disposed downstream of the treating zone.

9. The system of claim 1, wherein the nozzle assembly is disposed at the fiber outlet and wherein the nozzle assembly is configured to decrease an air velocity of ambient air entering the treating zone at the fiber outlet to less than 1.5 Mach.

10. The system of claim 1, further comprising at least one of:
   a third nozzle chamber having a predetermined nozzle chamber pressure $P_c < P_b$, the third nozzle chamber adjacent to the second nozzle chamber, and wherein the ratio $P_c/P_b$ is in a range from 60% to 140% of the pressure change ratio r; and
   a fourth nozzle chamber having a predetermined nozzle chamber pressure $P_d < P_c$, the fourth nozzle chamber adjacent to the third nozzle chamber, and wherein the ratio $P_d/P_c$ is in a range from 60% to 140% of the pressure change ratio r.

* * * * *

UNITED STATES PATENT AND TRADEMARK OFFICE
CERTIFICATE OF CORRECTION

PATENT NO. : 11,390,555 B2
APPLICATION NO. : 16/890055
DATED : July 19, 2022
INVENTOR(S) : Argaw et al.

It is certified that error appears in the above-identified patent and that said Letters Patent is hereby corrected as shown below:

In the Claims

In Column 29, Line 30, in Claim 1, delete "comprises" and insert -- comprising --.

In Column 29, Line 33, in Claim 1, delete "asre" and insert -- are --.

In Column 29, Line 36, in Claim 1, delete "whithin" and insert -- within --.

In Column 29, Line 40, in Claim 1, delete "rifst" and insert -- first --.

Signed and Sealed this
Twenty-first Day of November, 2023

Katherine Kelly Vidal
*Director of the United States Patent and Trademark Office*